US010564533B2

(12) United States Patent
Trisnadi et al.

(10) Patent No.: US 10,564,533 B2
(45) Date of Patent: Feb. 18, 2020

(54) LOW-PROFILE BEAM SPLITTER

(71) Applicant: Magic Leap, Inc., Plantation, FL (US)

(72) Inventors: Jahja Trisnadi, Cupertino, CA (US);
Pierre St. Hilaire, Belmont, CA (US);
Hui-Chuan Cheng, Cooper City, FL (US);
Clinton Carlisle, Parkland, FL (US);
Michael Anthony Klug, Austin, TX (US); Kevin Richard Curtis, Boulder, CO (US)

(73) Assignee: Magic Leap, Inc., Plantation, FL (US)

( * ) Notice: Subject to any disclaimer, the term of this patent is extended or adjusted under 35 U.S.C. 154(b) by 141 days.

(21) Appl. No.: 15/927,807

(22) Filed: Mar. 21, 2018

(65) Prior Publication Data

US 2018/0284585 A1 Oct. 4, 2018

Related U.S. Application Data

(60) Provisional application No. 62/474,543, filed on Mar. 21, 2017, provisional application No. 62/570,995, filed on Oct. 11, 2017.

(51) Int. Cl.
| | | |
|---|---|---|
| *G03B 21/20* | (2006.01) | |
| *G02B 27/10* | (2006.01) | |
| *G02B 27/09* | (2006.01) | |
| *G03B 21/00* | (2006.01) | |
| *G06K 9/00* | (2006.01) | |

(52) U.S. Cl.
CPC ..... *G03B 21/2066* (2013.01); *G02B 27/0944* (2013.01); *G02B 27/1006* (2013.01); *G03B 21/005* (2013.01); *G06K 9/00671* (2013.01)

(58) Field of Classification Search
CPC ............... G02B 27/10; G02B 27/1006; G02B 27/1033; G02B 27/1026; G02B 27/0101; G02B 27/103; G02B 27/01; G02B 2027/0105; G02B 2027/0172; G02B 2027/0174; G06K 9/00671
See application file for complete search history.

(56) References Cited

U.S. PATENT DOCUMENTS

| 5,617,227 A | 4/1997 | De Bougrenet De La Tocnaye et al. |
| 8,950,867 B2 | 2/2015 | Macnamara |
| (Continued) | | |

OTHER PUBLICATIONS

International Search Report and Written Opinion for PCT Application No. PCT/US2018/023621, dated Jun. 15, 2018.

*Primary Examiner* — William C. Dowling
(74) *Attorney, Agent, or Firm* — Knobbe, Martens, Olson & Bear, LLP

(57) ABSTRACT

Examples of light projector systems for directing input light from a light source to a spatial light modulator are provided. For example, an optical device is disclosed which includes a first surface having a diffractive optical element, a second surface normal to the first surface, and a third surface arranged at an angle to the second surface. The third surface may be a beam splitting surface that is reflective to light of a first state and transmissive to light of a second state. The diffractive optical element may receive an input beam made up of light having the first state, and convert the input beam into at least a first diffracted beam at a first diffraction angle such that the first diffracted beam is directed toward the third surface and is reflected by the third surface in a direction substantially parallel to the first surface.

54 Claims, 19 Drawing Sheets

(56) References Cited

U.S. PATENT DOCUMENTS

| | | |
|---|---|---|
| 9,215,293 B2 | 12/2015 | Miller |
| 9,310,559 B2 | 4/2016 | Macnamara |
| 9,348,143 B2 | 5/2016 | Gao et al. |
| D758,367 S | 6/2016 | Natsume |
| 9,417,452 B2 | 8/2016 | Schowengerdt et al. |
| 9,671,566 B2 | 6/2017 | Abovitz et al. |
| 9,791,700 B2 | 10/2017 | Schowengerdt et al. |
| 9,874,749 B2 | 1/2018 | Bradski et al. |
| 2002/0110320 A1 | 8/2002 | Carlisle et al. |
| 2002/0172237 A1* | 11/2002 | Murry ................. G02B 6/12007 372/18 |
| 2010/0014141 A1 | 1/2010 | Lapchuk et al. |
| 2011/0075259 A1 | 3/2011 | Shpunt |
| 2012/0127062 A1 | 5/2012 | Bar-Zeev et al. |
| 2013/0051730 A1 | 2/2013 | Travers et al. |
| 2013/0082922 A1 | 4/2013 | Miller |
| 2013/0125027 A1 | 5/2013 | Abovitz |
| 2014/0071539 A1 | 3/2014 | Gao |
| 2014/0177023 A1 | 6/2014 | Gao et al. |
| 2014/0218468 A1 | 8/2014 | Gao et al. |
| 2014/0306866 A1 | 10/2014 | Miller et al. |
| 2015/0103306 A1 | 4/2015 | Kaji et al. |
| 2015/0222883 A1 | 8/2015 | Welch |
| 2015/0222884 A1 | 8/2015 | Cheng |
| 2015/0234254 A1 | 8/2015 | Schowengerdt |
| 2015/0268415 A1 | 9/2015 | Schowengerdt et al. |
| 2015/0302652 A1 | 10/2015 | Miller et al. |
| 2015/0346490 A1 | 12/2015 | TeKolste et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2017/0010488 A1* | 1/2017 | Klug ................... G02B 5/1809 |

\* cited by examiner

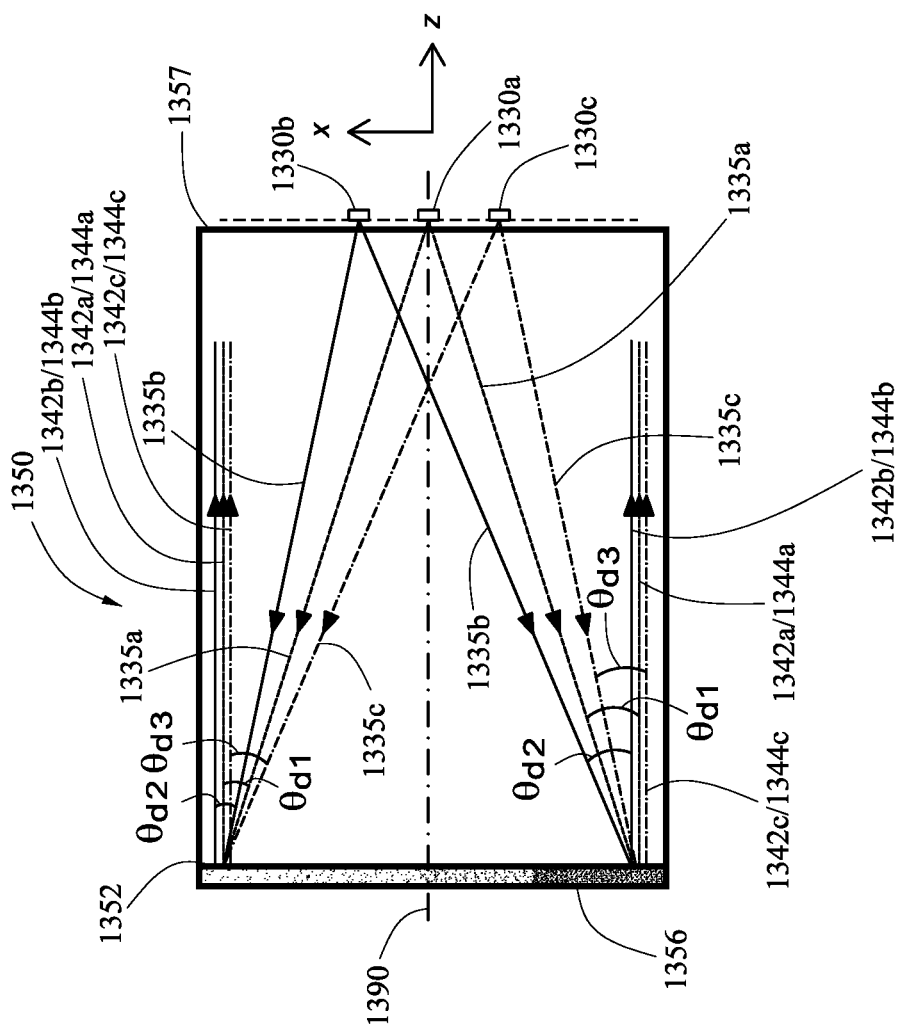

LOW-PROFILE BEAM SPLITTER

INCORPORATION BY REFERENCE TO ANY PRIORITY APPLICATIONS

This application claims priority to U.S. Provisional Patent Application 62/474,543, filed Mar. 21, 2017, and entitled "LOW-PROFILE BEAM SPLITTER," as well as to U.S. Provisional Patent Application 62/570,995, filed Oct. 11, 2017, and entitled "LOW-PROFILE BEAM SPLITTER," the contents of which are hereby expressly and fully incorporated by reference in their entireties, as though set forth in full.

BACKGROUND

Field

The present disclosure relates to virtual reality, augmented reality, and mixed reality imaging and visualization systems and, more particularly, to compact beam splitters for use in these and other optical systems.

Description of the Related Art

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality (VR) scenario typically involves presentation of digital or virtual image information without transparency to other actual real-world visual input. An augmented reality (AR) scenario typically involves presentation of digital or virtual image information as an augmentation to visualization of the actual real world around the user. A mixed reality (MR) scenario is a type of AR scenario and typically involves virtual objects that are integrated into, and responsive to, the actual real world. For example, in an MR scenario, AR image content may be blocked by or otherwise be perceived as interacting with objects in the actual real world.

In FIG. 1, an AR scene 10 is depicted wherein a user of AR technology sees a real-world park-like setting 20 featuring people, trees, buildings in the background, and a real-world platform 30. In addition to these items, the user of the AR technology also perceives that they "see" "virtual content" such as a robot statue 40 standing upon the real-world platform 30, and a cartoon-like avatar character 50 flying by, which seems to be a personification of a bumble bee, even though these elements 40, 50 do not exist in the real world.

Although VR, AR, and/or MR technologies can already provide users with interesting and enjoyable viewing experiences, there is a need for more compact and light weight VR, AR, and MR systems to further enhance the user experience. The systems and methods disclosed herein can help to achieve those goals.

SUMMARY

In some embodiments, an optical device comprises: a first surface comprising a transmissive diffractive optical element; a second surface normal to the first surface; and a third surface arranged at an angle to the second surface, the third surface being reflective to light of a first state and transmissive to light of a second state, wherein the transmissive diffractive optical element is configured to receive a collimated input beam that is normally incident on the first surface, the collimated input beam comprising light having the first state, and to convert the collimated input beam into at least a first diffracted beam at a first diffraction angle such that the first diffracted beam is directed toward the third surface and is reflected by the third surface in a direction substantially parallel to the first surface.

In some embodiments, an optical device comprises: a first surface comprising a reflective diffractive optical element; a second surface normal to the first surface; and a third surface arranged at an angle to the second surface, the third surface being reflective to light of a first state and transmissive to light of a second state; wherein the reflective diffractive optical element is configured to receive a diverging input beam, the diverging input beam comprising light having the first state, and to convert the diverging input beam into at least a first collimated and diffracted beam at a first diffraction angle such that the first collimated and diffracted beam is directed toward the third surface and is reflected by the third surface in a direction substantially parallel to the first surface.

In some embodiments, a head mounted display (HMD) configured to be worn on a head of a user comprises: a frame; projection optics supported by the frame and configured to project an image to an eye of the user; and a light projector system in optical communication with the projection optics, the light projector system configured to provide modulated light encoded with the image, the light projector system comprising: a light source to emit an input beam; an optical device comprising: a first surface with a diffractive optical element, a second surface normal to the first surface, and a third surface arranged at an angle to the second surface, the third surface being reflective to light of a first state and transmissive to light of a second state, wherein the diffractive optical element is configured to receive the input beam, the input beam comprising light having the first state, and to convert the input beam into at least a first diffracted beam at a first diffraction angle such that the first diffracted beam is directed toward the third surface and is reflected by the third surface in a direction substantially parallel to the first surface; and a spatial light modulator configured to produce the modulated light using the input beam delivered to the spatial light modulator by the optical device.

In some embodiments, an optical device comprises: a first surface comprising a diffractive optical element; a second surface normal to the first surface; and a third surface arranged at an angle to the second surface, the third surface being reflective to light of a first state and transmissive to light of a second state, wherein the diffractive optical element is configured to receive an input beam, the input beam comprising light having the first state, and to convert the input beam into at least a first diffracted beam at a first diffraction angle such that the first diffracted beam is directed toward the third surface and is reflected by the third surface in a direction substantially parallel to the first surface.

In some embodiments, a method of transmitting image information to a user comprises: providing an optical device comprising a first surface, a second surface normal to the first surface, and a third surface arranged at an angle to the second surface, the third surface being reflective to light of a first state and transmissive to light of a second state; producing an input beam incident on the first surface, the input beam traveling normal to the first surface and having a first state; providing a transmissive diffractive optical element on the first surface to convert the input beam into at least a first diffracted beam at a first diffraction angle such that the first diffracted beam is directed toward the third surface and is reflected by the third surface in a direction substantially parallel to the first surface; modulating at least the reflected first diffracted beam with image information using a spatial light modulator, the spatial light modulator being configured to receive the reflected first diffracted beam normal to the spatial light modulator and to produce a modulated light beam having a second state; receiving the modulated light beam using one or more projection optical components; and projecting the image information to the user using the one or more projection optical components.

In some embodiments, a method of transmitting image information to a user comprises: providing an optical device comprising a first surface, a second surface normal to the first surface and a third surface arranged at an angle with respect to the second surface, the third surface being reflective to light of a first state and transmissive to light of a second state; producing a diverging input light beam incident onto the first surface, the diverging input light beam having a first state; providing a reflective diffractive optical element on the first surface to convert the diverging input beam into at least a first collimated and diffracted beam at a first diffraction angle such that the first collimated and diffracted beam is directed toward the third surface and is reflected by the third surface in a direction substantially parallel to the first surface; modulating at least the reflected first diffracted beam with image information using a spatial light modulator, the spatial light modulator configured to receive the reflected first diffracted beam normal to the spatial light modulator and to produce a modulated light beam having a second state; receiving the modulated light beam using one or more projection optical components; and projecting the image information to the user using the one or more projection optical components.

BRIEF DESCRIPTION OF THE DRAWINGS

FIGS. 13B and 13C respectively schematically illustrate a side view and a top view of the low-profile BS of FIG. 13A, showing collimation and multiplexing of diverging input light from multiple light sources, according to some embodiments.

DETAILED DESCRIPTION

Overview

Figure 1:
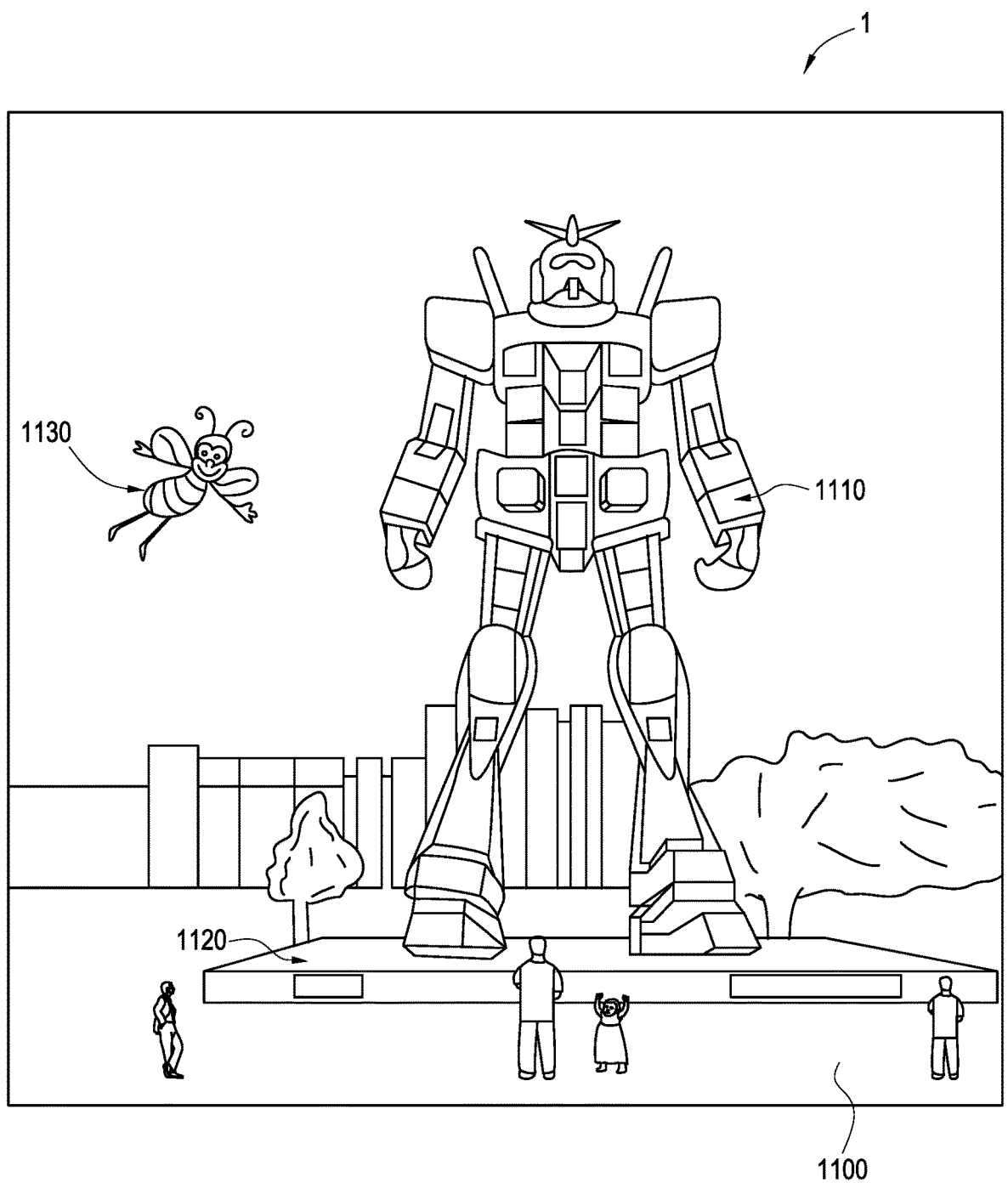
FIG. 1 illustrates a user's view of augmented reality (AR) through an AR device, according to some embodiments.

A head mounted display (HMD) may use a light projector system to display virtual reality (VR), augmented reality (AR), or mixed reality (MR) content to a user by directing input light from a light source to a spatial light modulator (SLM), which may encode the input light with image information and then reflect or transmit the resulting modulated light to the user via one or more optical elements. A beam splitter (BS) may be used in a light projector system to direct the input light toward the SLM, and to receive the modulated light from the SLM and direct it toward the user (possibly via one or more intervening optical components).

The BS may include an input surface to receive the input light from the light source. The input light may then propagate to a beam splitting surface, which re-directs light in one of two directions based on a characteristic of the light, such as its polarization. The beam splitting surface may re-direct at least a portion of the input light toward an output/input surface of the BS. The output/input surface first outputs the input light to another optical component, such as a SLM located adjacent to the output/input surface. The SLM may modulate the input light with image information and then reflect the modulated light back toward the output/input surface of the BS. The modulated light then re-enters the BS through the output/input surface of the BS and at least a portion of the modulated light can then pass through the beam splitting surface and ultimately exit the BS at an output surface. In some embodiments, opposite sides of the input surface are respectively joined to the output/input surface and the output surface of the BS at right angles. The beam splitting surface may be arranged at an angle with respect to these surfaces.

For HMD applications, it may be advantageous for the BS to direct the input light toward the SLM in a direction normal to the input plane of the SLM. Furthermore, to achieve proper image reproduction for uninterrupted viewing by the user, the light projector system may be designed to illuminate the entire input plane of the SLM with input light having a uniform wavefront (e.g., collimated light having relatively little, if any, wavefront curvature). One example of a BS which can meet these qualifications is a cube BS. In a cube BS, the input surface and the output/input surface may be two adjoining faces of the cube BS. Meanwhile, the beam splitting surface may extend between the input surface and the output/input surface at 45 degree angles. In cross-section, the beam splitting surface is the hypotenuse of a 45 degree right triangle having the input surface and the output/input surface as the other two legs.

The size of the BS may impact the size of light projector system and the HMD which utilizes the light projector system. Since there is a continuing demand to reduce the sizes of HMDs, there is also a demand to reduce the sizes of their constituent parts, such as the light projector system. Thus, it may be desirable to reduce the size of the BS utilized in the light projector system. For example, it would be advantageous to provide a BS with at least one dimension of reduced size.

Therefore, various embodiments of a low-profile light projector system are described herein. Some embodiments of the low-profile light projector system may include a low-profile BS with at least one dimension (e.g., the height of an input surface) that is shorter than one or more other dimensions (e.g., the width of the output/input surface). In such embodiments, the beam splitting surface no longer forms 45 degree angles with the input surface and the output/input surface. Instead, the beam splitting surface forms an angle of less than 45 degrees with either the input surface or the output/input surface. In addition, the low-profile BS is no longer a cube.

In order to maintain similar capabilities as a cube BS for illuminating an SLM with collimated light, a transmissive or reflective diffractive optical element may be provided on, in, or adjacent to a surface of the low-profile BS. Among other possible functions described herein, the diffractive optical element may be configured to convert an input beam of light into one or more diffracted beams. The one or more diffracted beams may be diffracted at appropriate angles such that they are ultimately reflected at the beam splitting surface, possibly after one or more intervening internal reflections at one or more other surfaces of the low-profile BS, toward the output/input surface and an adjacent SLM at a normal angle. Together, the one or more diffracted beams can provide an equivalent or similar amount of illumination coverage for the SLM as a cube BS having at least one larger dimension. The use of a diffractive optical element, as described herein, permits a reduction in the angle between the beam splitting plane and, for example, the output/input surface of the low-profile BS, thereby allowing for an overall reduction in the height of the low-profile BS (e.g., the dimension of the input surface of the low-profile BS) without negatively impacting the optical functions of the low-profile BS in the projector system.

Example HMD Device

Figure 2:
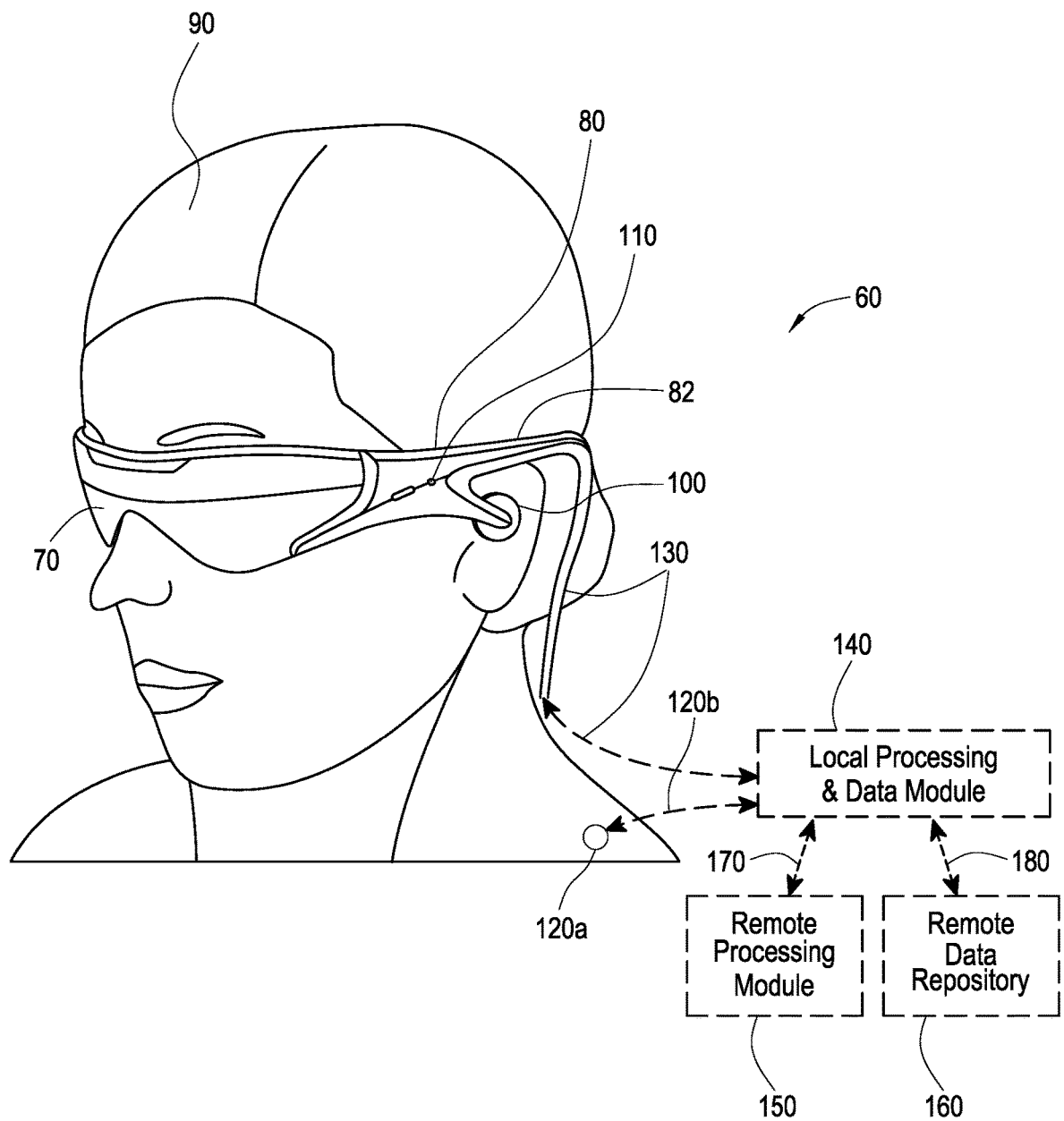
FIG. 2 illustrates an example of a wearable display system, according to some embodiments.

FIG. 2 illustrates an example of wearable display system 60, according to some embodiments. The display system 60 includes a display 70, and various mechanical and electronic modules and systems to support the functioning of the display 70. The display 70 may be coupled to a frame 80, which is wearable by a display system user 90 and which is configured to position the display 70 in front of the eyes of the user 90. In some embodiments, the display 70 may be considered eyewear. In some embodiments, a speaker 100 is coupled to the frame 80 and configured to be positioned adjacent an ear canal of the user 90. In some embodiments, the display system 60 may also include one or more microphones 110 or other devices to detect sound. In some embodiments, the microphone 110 is configured to allow the user 90 to provide inputs or commands to the display system 60 (e.g., the selection of voice menu commands, natural language questions, etc.), and/or may allow audio communication with other persons (e.g., with other users of similar display systems). The microphone 110 may further be configured as a peripheral sensor to collect audio data (e.g., sounds from the user 90 and/or environment). In some embodiments, the display system 60 may also include a peripheral sensor 120a, which may be separate from the frame 80 and attached to the body of the user 90 (e.g., on the head, torso, an extremity, etc., of the user 90). In some embodiments, the peripheral sensor 120a may be configured to acquire data characterizing the physiological state of the user 90.

The display 70 is operatively coupled by a communications link 130, such as by a wired lead or wireless connectivity, to a local processing and data module 140 which may be mounted in a variety of configurations, such as fixedly attached to the frame 80, fixedly attached to a helmet or hat worn by the user 90, embedded in headphones, or otherwise removably attached to the user 90 (e.g., in a backpack-style configuration, in a belt-coupling style configuration, etc.). Similarly, the peripheral sensor 120a may be operatively coupled by a communications link 120b (e.g., a wired lead or wireless connectivity) to the local processing and data module 140. The local processing and data module 140 may include a hardware processor, as well as digital memory, such as non-volatile memory (e.g., flash memory or hard disk drives), both of which may be utilized to assist in the processing, caching, and storage of data. The data may include data a) captured from sensors (which may be, for example, operatively coupled to the frame 80 or otherwise attached to the user 90), such as image capture devices (such as, for example, cameras), microphones, inertial measurement units, accelerometers, compasses, GPS units, radio devices, gyros, and/or other sensors disclosed herein; and/or b) acquired and/or processed using a remote processing module 150 and/or a remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and the remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some embodiments, one or more of these sensors may be attached to the frame 80, or may be standalone devices that communicate with the local processing and data module 140 by wired or wireless communication pathways.

The remote processing module 150 may include one or more processors configured to analyze and process data and/or image information. In some embodiments, the remote data repository 160 may be a digital data storage facility, which may be available through the internet or other networking configuration in a "cloud" resource configuration. In some embodiments, the remote data repository 160 may include one or more remote servers, which provide information (e.g., information for generating augmented reality content) to the local processing and data module 140 and/or the remote processing module 150. In some embodiments, all data is stored and all computations are performed in the local processing and data module 140, allowing fully autonomous use from a remote module.

Figure 3:
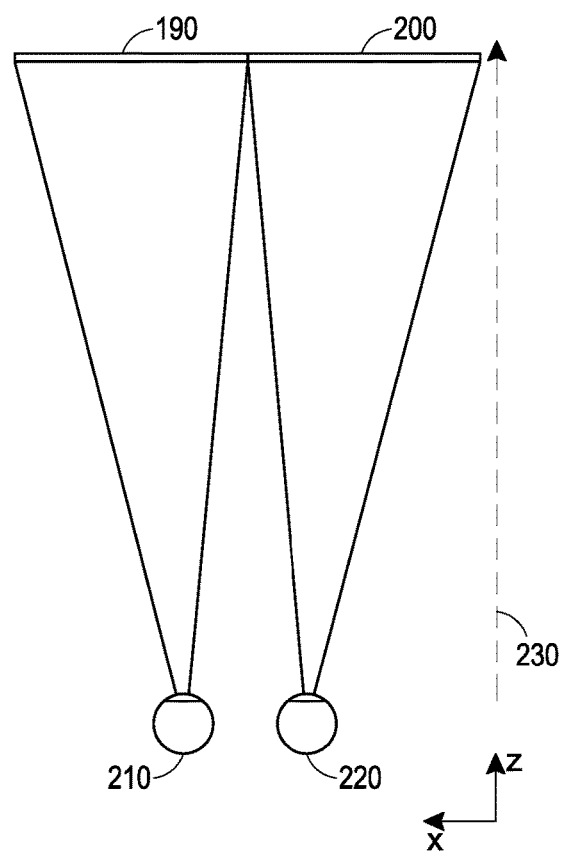
FIG. 3 illustrates a display system for simulating three-dimensional imagery for a user, according to some embodiments.

The perception of an image as being "three-dimensional" or "3-D" may be achieved by providing slightly different presentations of the image to each eye of the user. FIG. 3 illustrates a display system for simulating 3-D imagery for a user. Two distinct images 190, 200—one for each eye 210, 220—are outputted to the user. The images 190, 200 are spaced from the eyes 210, 220 by a distance 230 along an optical or z-axis that is parallel to the line of sight of the user. The images 190, 200 are flat and the eyes 210, 220 may focus on the images by assuming a single accommodated state. Such 3-D display systems rely on the human visual system to combine the images 190, 200 to provide a perception of depth and/or scale for the combined image.

However, the human visual system is complicated and providing a realistic perception of depth is challenging. For example, many users of "3-D" display systems find such systems to be uncomfortable or may not perceive a sense of depth at all. Without being limited by theory, it is believed that objects may be perceived as being "3-D" due to a combination of vergence and accommodation. Vergence movements (e.g., rotation of the eyes so that the pupils move toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex," as well as pupil dilation or constriction. Likewise, under normal conditions, a change in vergence will trigger a matching change in accommodation of lens shape and pupil size. As noted herein, many stereoscopic or "3-D" display systems display a scene using slightly different presentations (and, so, slightly different images) to each eye such that a 3-D perspective is perceived by the human visual system. Such systems are uncomfortable for many users, however, since they simply provide image information at a single accommodated state and work against the "accommodation-vergence reflex." Display systems that provide a better match between accommodation and vergence may form more realistic and comfortable simulations of 3-D imagery.

Figure 4:
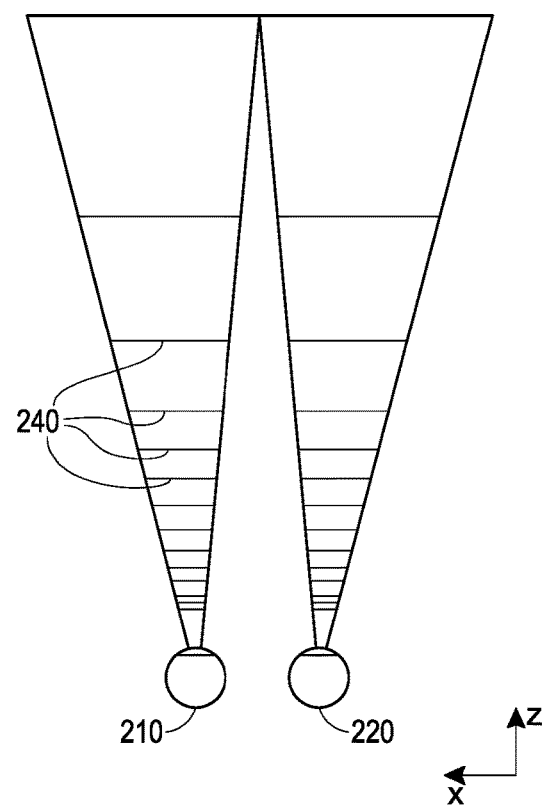
FIG. 4 illustrates aspects of an approach for simulating three-dimensional imagery using multiple depth planes, according to some embodiments.

FIG. 4 illustrates aspects of an approach for simulating 3-D imagery using multiple depth planes. With reference to FIG. 4, the eyes 210, 220 assume different accommodated states to focus on objects at various distances on the z-axis. Consequently, a particular accommodated state may be said to be associated with a particular one of the illustrated depth planes 240, which has an associated focal distance, such that objects or parts of objects in a particular depth plane are in focus when the eye 210, 220 is in the accommodated state for that depth plane. In some embodiments, 3-D imagery may be simulated by providing different presentations of an image for each of the eyes 210, 220, and also by providing different presentations of the image corresponding to multiple depth planes. While the fields of view of the eyes 210, 220 are shown as being separate for clarity of illustration, they may overlap, for example, as distance along the z-axis increases. In addition, while the depth planes are shown as being flat for ease of illustration, it will be appreciated that the contours of a depth plane may be curved in physical space, such that all features in a depth plane are in focus with the eye in a particular accommodated state.

Figure 5A:
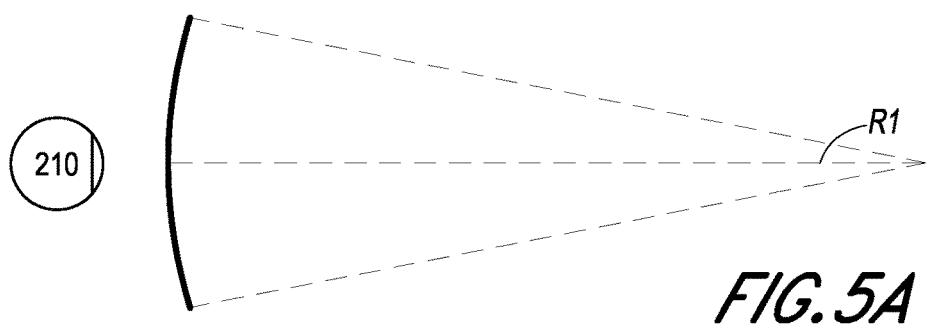
FIGS. 5A-5C illustrate relationships between radius of curvature and focal radius, according to some embodiments.
Figure 5B:
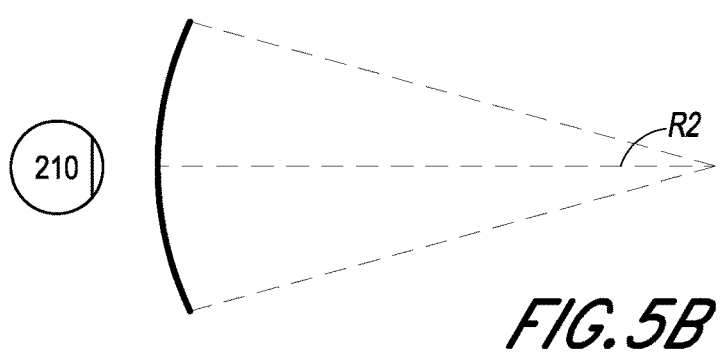
Figure 5C:
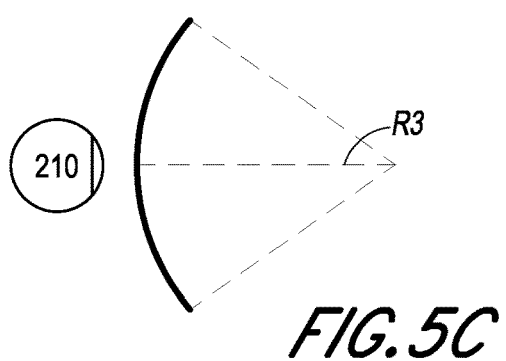

The distance between an object and an eye 210 or 220 may also change the amount of divergence of light from that object, as viewed by that eye. FIGS. 5A-5C illustrate relationships between distance and the divergence of light rays. The distance between the object and the eye 210 is represented by, in order of decreasing distance, R1, R2, and R3. As shown in FIGS. 5A-5C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye 210. The curvature increases with decreasing distance between the object and the eye 210. Consequently, at different depth planes, the degree of divergence of light rays is also different, with the degree of divergence increasing with decreasing distance between depth planes and the eye 210. While only a single eye 210 is illustrated for clarity of illustration in FIGS. 5A-5C and other figures herein, it will be appreciated that the discussions regarding the eye 210 may be applied to both eyes 210 and 220.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. The different presentations may be separately focused by the user's eyes, thereby helping to provide the user with depth cues based on the accommodation of the eye required to bring into focus different image features for the scene located on different depth planes and/or based on observing different image features on different depth planes being out of focus.

Example of a Waveguide Stack Assembly

Figure 6:
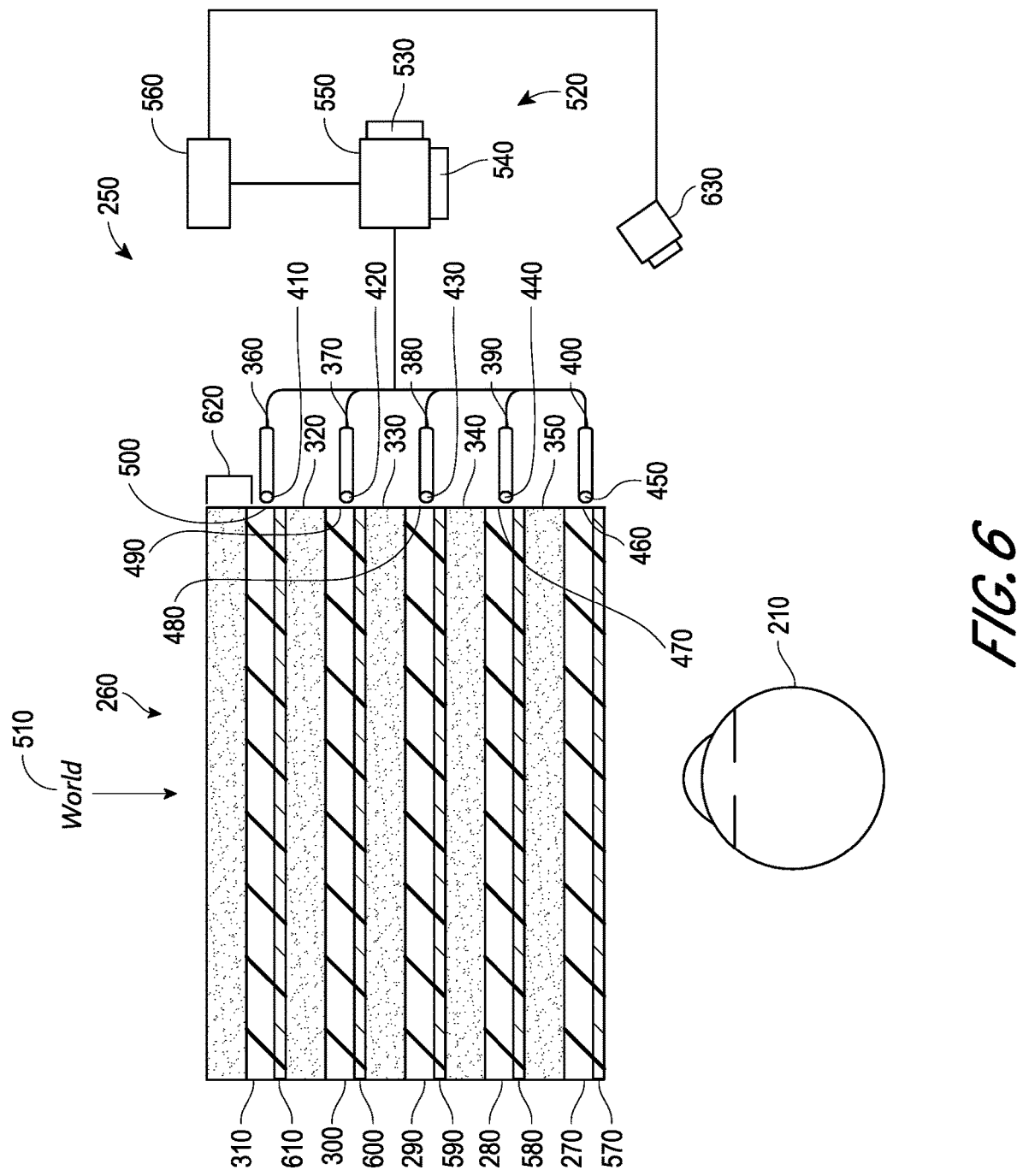
FIG. 6 illustrates an example of a waveguide stack for outputting image information to a user, according to some embodiments.

FIG. 6 illustrates an example of a waveguide stack for outputting image information to a user, according to some embodiments. A display system 250 includes a stack of waveguides, or stacked waveguide assembly, 260 that may be utilized to provide 3-D perception to the eye/brain using a plurality of waveguides 270, 280, 290, 300, 310. In some embodiments, the display system 250 is the display system 60 of FIG. 2, with FIG. 6 schematically showing some parts of that display system 60 in greater detail. For example, the stacked waveguide assembly 260 may be part of the display 70 of FIG. 2. It will be appreciated that, in some embodiments, the display system 250 may be considered a light field display.

The stacked waveguide assembly 260 may also include one or more features 320, 330, 340, 350 between the waveguides 270, 280, 290, 300, 310. In some embodiments, the features 320, 330, 340, 350 may be one or more lenses. The waveguides 270, 280, 290, 300, 310 and/or the one or more lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides 270, 280, 290, 300, 310 and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, each of the input surfaces 460, 470, 480, 490, 500 may be an edge of a corresponding waveguide, or may be part of a major surface of the corresponding waveguide (that is, one of the waveguide surfaces directly facing the world 510 or the eye 210). In some embodiments, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some embodiments, the image injection devices 360, 370, 380, 390, 400 are the output ends of a single multiplexed display which may, for example, pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projector system 520, which includes a light module 530, which may include a light source or light emitter, such as a light emitting diode (LED). The light from the light module 530 may be directed to, and modified by, a light modulator 540 (e.g., an SLM, via a BS 550. The light modulator 540 may be configured to spatially and/or temporally change the perceived intensity of the light injected into the waveguides 270, 280, 290, 300, 310. Examples of SLMs include liquid crystal displays (LCD) including a liquid crystal on silicon (LCOS) displays and digital light processing (DLP) displays.

In some embodiments, the light projector system 520, or one or more components thereof, may be attached to the frame 80 of FIG. 2. For example, the light projector system 520 may be part of a temporal portion (e.g., ear stem 82 of FIG. 2) of the frame 80 or disposed at an edge of the display 70. In some embodiments, the light module 530 may be separate from the BS 550 and/or the light modulator 540, and in optical communication therewith.

In some embodiments, the display system 250 may be a scanning fiber display including one or more scanning fibers configured to project light in various patterns (e.g., raster scan, spiral scan, Lissajous patterns, etc.) into one or more waveguides 270, 280, 290, 300, 310 and ultimately to the eye 210. In some embodiments, the illustrated image injection devices 360, 370, 380, 390, 400 may schematically represent one or more scanning fibers, or one or more bundles of scanning fibers, configured to inject light into one or more of the waveguides 270, 280, 290, 300, 310. One or more optical fibers may be configured to transmit light from the light module 530 to the one or more waveguides 270, 280, 290, 300, and 310. In addition, one or more intervening optical structures may be provided between the scanning fiber, or fibers, and the one or more waveguides 270, 280, 290, 300, 310 to, for example, redirect light exiting the scanning fiber into the one or more waveguides 270, 280, 290, 300, 310.

A controller 560 controls the operation of the stacked waveguide assembly 260, including operation of the image injection devices 360, 370, 380, 390, 400, the light module 530, and the light modulator 540. In some embodiments, the controller 560 is part of the local processing and data module 140. The controller 560 includes programming (e.g., instructions in a non-transitory medium) that regulates the timing and provision of image information to the waveguides 270, 280, 290, 300, 310 according to, for example, any of the various schemes disclosed herein. In some embodiments, the controller 560 may be a single integral device, or a distributed system connected by wired or wireless communication channels. In some embodiments, the controller 560 may be part of the modules 140 or 150 of FIG. 2.

The waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements 570, 580, 590, 600, 610 may also be referred to light extracting optical elements. An extracted beam of light may be outputted by the waveguide at locations at which the light propagating in the waveguide strikes a light extracting optical element. The out-coupling optical elements 570, 580, 590, 600, 610 may be, for example, gratings, including diffractive optical features, as discussed further herein. While the out-coupling optical elements 570, 580, 590, 600, 610 are illustrated disposed at the bottom major surfaces of the waveguides 270, 280, 290, 300, 310 for ease of description and drawing clarity, in some embodiments they may be disposed at the top and/or bottom major surfaces, and/or may be disposed directly in the volume of the waveguides 270, 280, 290, 300, 310. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

Each waveguide 270, 280, 290, 300, 310 may be configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it can reach the eye 210; the first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first lens 350 and the second lens 340 before reaching the eye 210; the combined optical power of the first lens 350 and the second lens 340 may be configured to create another incremental amount of wavefront curvature so that the eye/brain interprets light coming from the third waveguide 290 as coming from a second focal plane that is even closer inward toward the eye 210 from optical infinity.

The other waveguide layers 300, 310 and lenses 330, 320 are similarly configured, with the highest waveguide 310 in the stacked waveguide assembly 260 sending its output through all of the lenses 320, 330, 340, 350 between it and the eye 210 for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements 570, 580, 590, 600, 610 of the waveguides 270, 280, 290, 300, 310 and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This can provide advantages for forming a tiled image to provide an expanded field of view at those depth planes.

The out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the out-coupling optical elements 570, 580, 590, 600, 610 may be volumetric or surface features, which may be configured to output light at specific angles. For example, the out-coupling optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may include a layer of polymer dispersed liquid crystal, in which microdroplets form a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and IR light cameras) may be provided to capture images of the eye 210, parts of the eye 210, or at least a portion of the tissue surrounding the eye 210 to, for example, detect user inputs, extract biometric information from the eye 210, estimate and track the gaze of the direction of the eye 210, to monitor the physiological state of the user, and the like. As used herein, a camera may be any image capture device. In some embodiments, the camera assembly 630 may include an image capture device and a light source to project light (e.g., IR or near-IR light) to the eye 210, which may then be reflected by the eye 210 and detected by the image capture device. In some embodiments, the light source includes light emitting diodes ("LEDs"), emitting in IR or near-IR. In some embodiments, the camera assembly 630 may be attached to the frame 80 shown in FIG. 2 and may be in electrical communication with the modules 140 or 150, which may process image information from the camera assembly 630 to make various determinations regarding, for example, the physiological state of the user, the gaze direction of the user, iris identification, and the like. It will be appreciated that information regarding the physiological state of user may be used to determine the behavioral or emotional state of the user. Examples of such information include movements of the user or facial expressions of the user. The behavioral or emotional state of the user may then be triangulated with collected environmental or virtual content data so as to determine relationships between the behavioral or emotional state, physiological state, and environmental or virtual content data. In some embodiments, one camera assembly 630 may be utilized for each eye, to separately monitor each eye.

Figure 7:
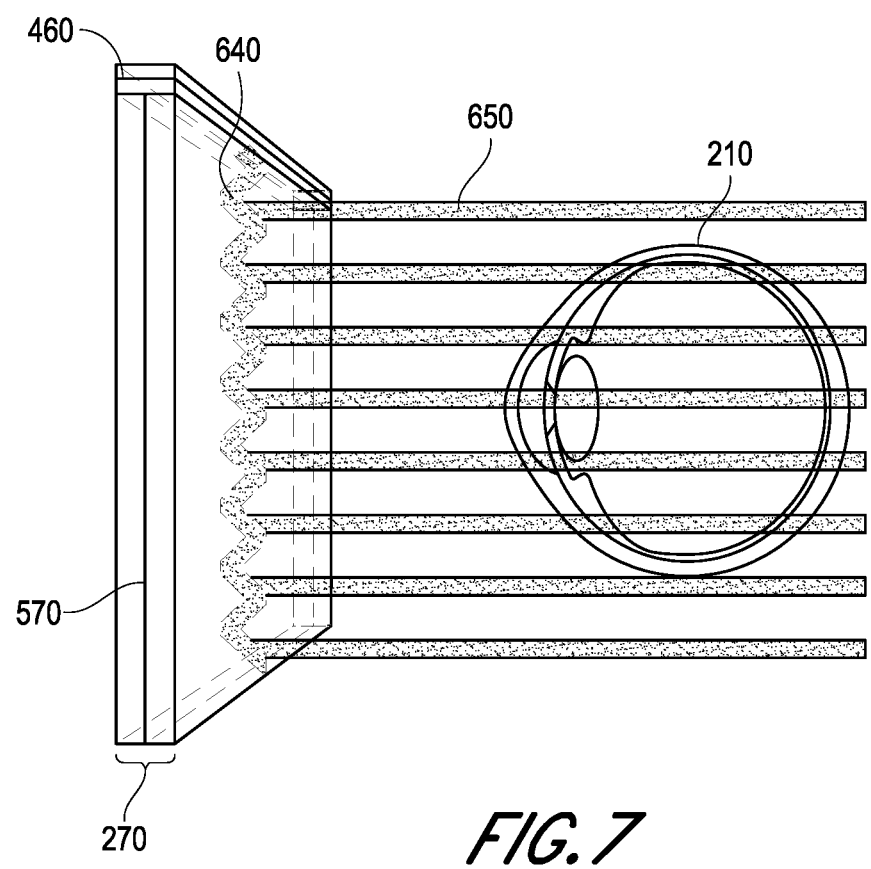
FIG. 7 illustrates an example of exit beams outputted by a waveguide, according to some embodiments.

FIG. 7 illustrates an example of exit beams outputted by a waveguide. One waveguide is illustrated, but other waveguides in the stacked waveguide assembly 260 of FIG. 6 may function similarly, where the stacked waveguide assembly 260 includes multiple waveguides. Light 640 is injected into the waveguide 270 at the input surface 460 of the waveguide 270 and propagates within the waveguide 270 by TIR. At points where the light 640 impinges on the out-coupling optical element (e.g., DOE) 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
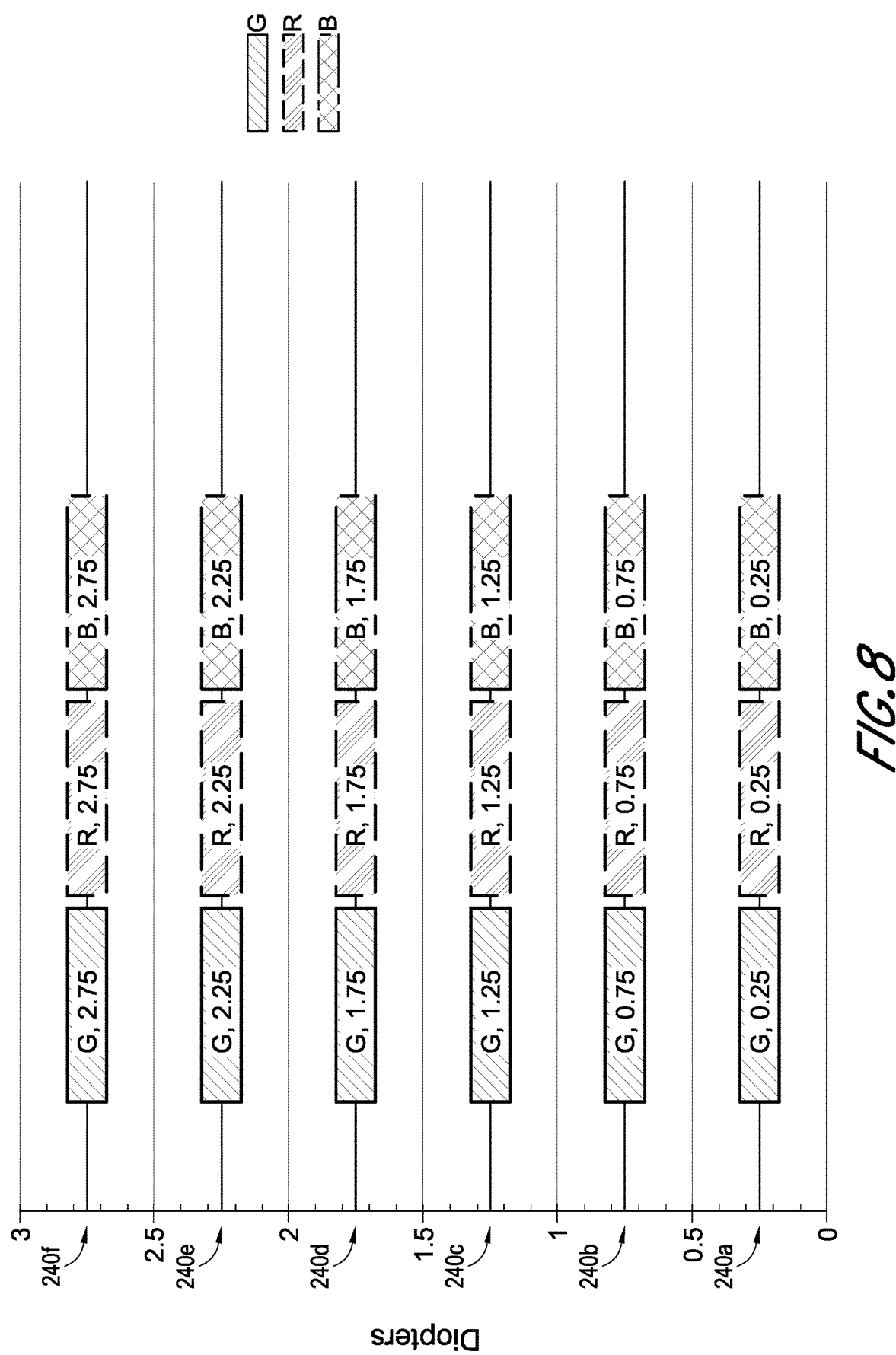
FIG. 8 illustrates an example of a stacked waveguide assembly in which each depth plane includes images formed using multiple different component colors, according to some embodiments.

In some embodiments, a full color image may be formed at each depth plane by overlaying images in each of the component colors, for example, three or more component colors. FIG. 8 illustrates an example of a stacked waveguide assembly in which each depth plane includes images formed using multiple different component colors. The illustrated embodiment shows depth planes 240a-240f, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a user, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, for example, only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue. In some embodiments, features 320, 330, 340, and 350 may be active or passive optical filters configured to block or selectively pass light from the ambient environment to the user's eyes.

References to a given color of light throughout this disclosure should be understood to encompass light of one or more wavelengths within a range of wavelengths of light that are perceived by a user as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light module 530 of FIG. 6 may be configured to emit light of one or more wavelengths outside the visual perception range of the user, for example, IR or ultraviolet wavelengths. IR light can include light with wavelengths in a range from 700 nm to 10 am. In some embodiments, IR light can include near-IR light with wavelengths in a range from 700 nm to 1.5 am. In addition, the in-coupling, out-coupling, and other light redirecting structures of the waveguides of the display system 250 may be configured to direct and emit this light out of the display towards the eye 210, for example, for imaging or user stimulation applications.

Figure 9A:
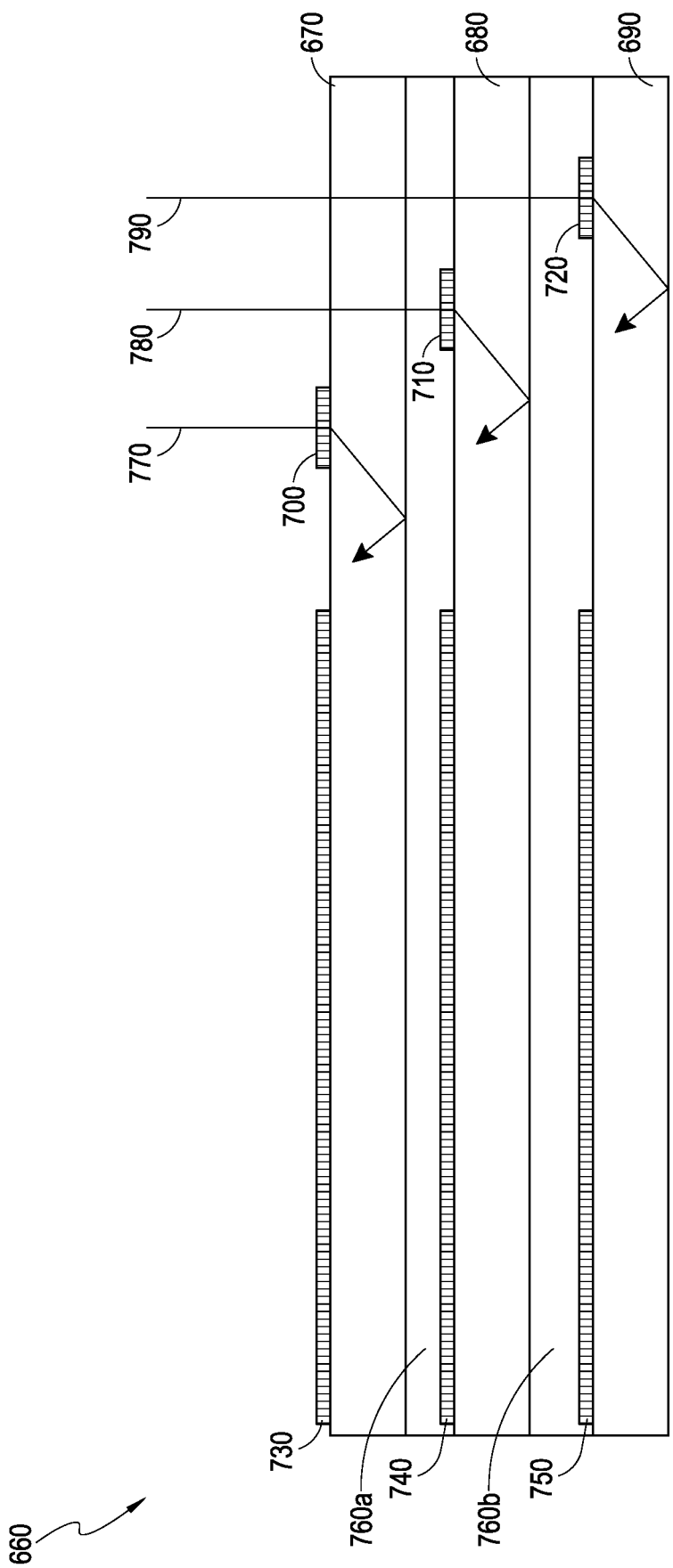
FIG. 9A illustrates a cross-sectional side view of an example of a set of stacked waveguides that each includes an in-coupling optical element, according to some embodiments.

With reference now to FIG. 9A, in some embodiments, light impinging on a waveguide may need to be redirected to in-couple the light into the waveguide. An in-coupling optical element may be used to redirect and in-couple the light into its corresponding waveguide. FIG. 9A illustrates a cross-sectional side view of an example of a set 660 of stacked waveguides that each includes an in-coupling optical element. The waveguides may each be configured to output light of one or more different wavelengths, or one or more different ranges of wavelengths. It will be appreciated that the set 660 may correspond to the stacked waveguide assembly 260 of FIG. 6 and the illustrated waveguides of the set 660 may correspond to part of the one or more waveguides 270, 280, 290, 300, 310, except that light from one or more of the image injection devices 360, 370, 380, 390, 400 is injected into the waveguides from a position that requires light to be redirected for in-coupling.

The set 660 of stacked waveguides includes waveguides 670, 680, and 690. Each waveguide includes an associated in-coupling optical element (which may also be referred to as a light input area on the waveguide), with, for example, in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, for example, light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750 may be disposed on a bottom major surface of associated waveguides 670, 680, 690, respectively. In some other embodiments, the light distributing elements 730, 740, 750 may be disposed on both top and bottom major surface of associated waveguides 670, 680, 690 respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, for example, gas, liquid, or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate TIR of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some embodiments, the material forming the waveguides 670, 680, 690 may be different between one or more waveguides, or the material forming the layers 760a, 760b may be different, while still holding to the various refractive index relationships noted above.

Light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 have different properties, for example, different wavelengths or different ranges of wavelengths, which may correspond to different colors. The in-coupling optical elements 700, 710, 720 each deflect the incident light such that the light propagates through a respective one of the waveguides 670, 680, 690 by TIR.

For example, in-coupling optical element 700 may be configured to deflect ray 770, which has a first wavelength or range of wavelengths. Similarly, the transmitted ray 780 impinges on and is deflected by the in-coupling optical element 710, which is configured to deflect light of a second wavelength or range of wavelengths. Likewise, the ray 790 is deflected by the in-coupling optical element 720, which is configured to selectively deflect light of third wavelength or range of wavelengths.

The deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
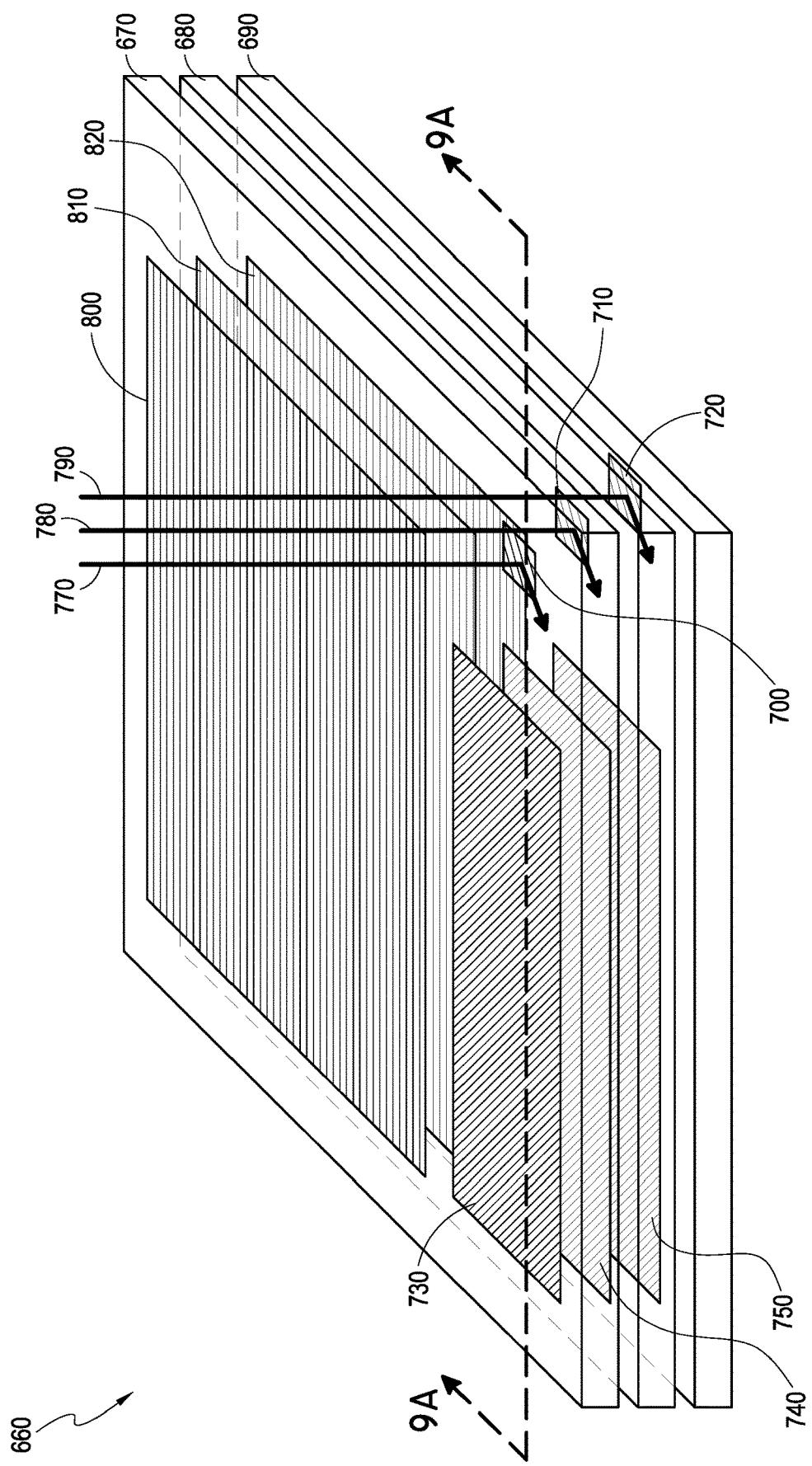
FIG. 9B illustrates a perspective view of an example of the stacked waveguides of FIG. 9A, according to some embodiments.

With reference now to FIG. 9B, a perspective view of an example of the stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, and 820, respectively.

In some embodiments, the light distributing elements 730, 740, 750 are orthogonal pupil expanders (OPEs). In some embodiments, the OPEs both deflect or distribute light to the out-coupling optical elements 800, 810, 820 and also increase the beam or spot size of this light as it propagates to the out-coupling optical elements. In some embodiments, for example, where the beam size is already of a desired size, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EPs) or exit pupil expanders (EPEs) that direct light toward an eye 210, as shown in FIG. 7. It will be appreciated that the OPEs may be configured to increase the dimensions of the eye box in at least one axis and the EPEs may be to increase the eye box in an axis crossing, for example, orthogonal to, the axis of the OPEs.

Accordingly, with reference to FIGS. 9A and 9B, in some embodiments, the set 660 of waveguides includes waveguides 670, 680, 690; in-coupling optical elements 700, 710, 720; light distributing elements (e.g., OPEs) 730, 740, 750; and out-coupling optical elements (e.g., EPs) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle that will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPEs) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EPs) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the user, who also receives the out-coupled light from the other waveguides 670, 680.

Figure 9C:
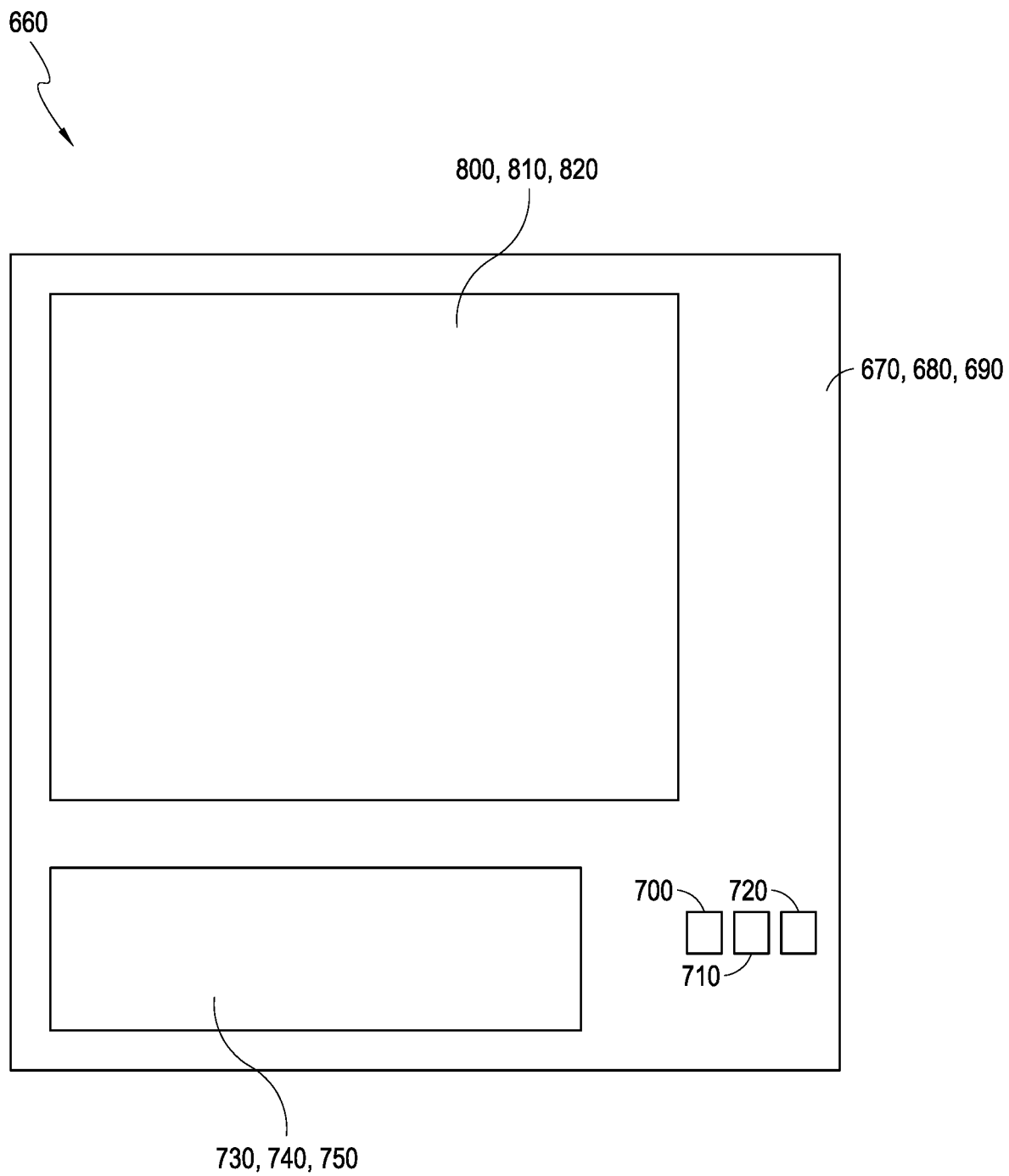
FIG. 9C illustrates a top-down plan view of an example of the stacked waveguides of FIGS. 9A and 9B, according to some embodiments.

FIG. 9C illustrates a top-down plan view of an example of the stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this non-overlapping spatial arrangement facilitates the injection of light from different resources into different waveguides on a one-to-one basis, thereby allowing a specific light source to be uniquely coupled to a specific waveguide. In some embodiments, arrangements including non-overlapping spatially separated in-coupling optical elements may be referred to as a shifted pupil system, and the in-coupling optical elements within these arrangements may correspond to sub pupils.

Example Light Projector System

In some display systems (e.g., the display system 250 of FIG. 6), a beam splitter (BS) may be used to direct light from a light source (e.g., the light module 530) to a light modulator (e.g., the light modulator 540), which may modulate and reflect the light back through the BS to a user (possibly via one or more intervening optical components). The light modulator may be a spatial light modulator (SLM), such as a liquid crystal on silicon (LCOS) panel, which encodes the input light with, for example, VR, AR, and/or MR image information. In some embodiments, the SLM modulates the input light and then reflects the modulated light at least partially back toward the direction of incidence of the input light, which may be referred to as a "front lit configuration." While embodiments are described herein with reference to a front lit configuration, other configurations are possible, such as a back lit configuration where the SLM modulates the input light and then transmits the modulated light.

Figure 10:
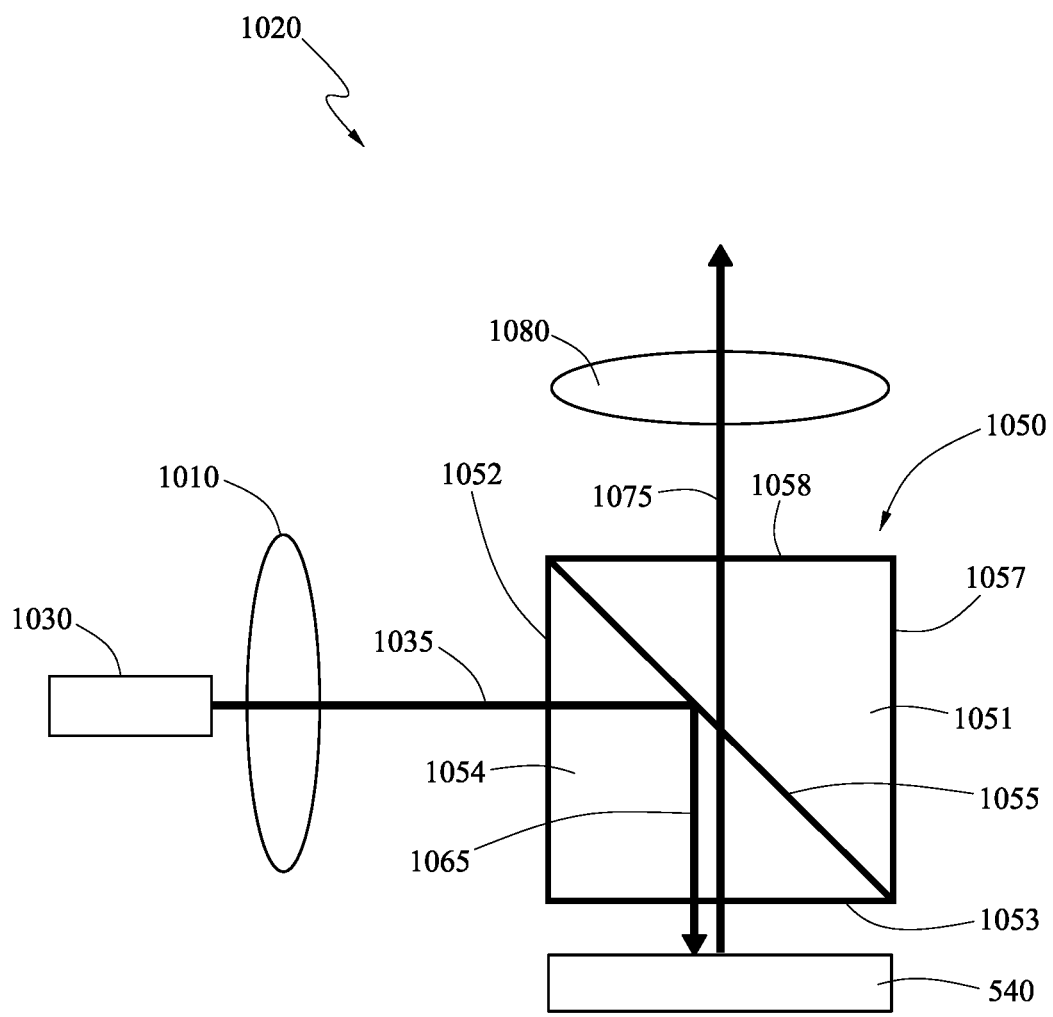
FIG. 10 illustrates an example light projector system which includes a beam splitter (BS), a light source, and a light modulator, according to some embodiments.

FIG. 10 illustrates an example light projector system 1020 including a beam splitter (BS) 1050, a light source 1030, and a spatial light modulator (SLM) 540. Embodiments of the light projector system 1020 can be used with HMD and display systems described herein (e.g., the display system 60 of FIG. 2 or the light projector system 520 of FIG. 6). For example, the light projector system 1020 may be used to provide image information to a user via the stacked waveguide assembly 260 of FIG. 6. The light source 1030 may be part of the light module 530 of FIG. 6 and the BS 1050 may be the BS 550, where the light projector system 1020 is configured to direct light into projection optics 1080 (e.g., image injection device 360, 370, 380, 390, or 400 or one or more of the waveguides 270, 280, 290, 300, or 310).

As illustrated, the light source 1030 produces an input light beam that propagates toward an input surface 1052 of the BS 1050. The input light beam is made up of one or more input light rays, one of which is illustrated as input light ray 1035. In some embodiments, the light source 1030 may be configured to emit white light or light of a given color (e.g., a range of wavelengths perceived by a user as a given color). In some embodiments, the light source 1030 may alternatively emit light of one or more wavelengths outside the visual perception range of the user (e.g., infrared or ultraviolet wavelengths). In some embodiments, the light source 1030 may be made up of one or more light sources (e.g., as described below in connection with FIGS. 13B and 13C).

The BS 1050 has the input surface 1052, a beam splitting surface 1055, and an output/input surface 1053. The input surface 1052, the beam splitting surface 1055, and the output/input surface 1053 may be surfaces of an input wedge or prism 1054. In such embodiments, the input surface 1052 and the output/input surface 1053 may be adjacent to one another and joined at a 90 degree angle. Meanwhile, the beam splitting surface 1055 may be arranged at 45 degree angles between the input surface 1052 and the output/input surface 1053. The BS 1050 may also include an output wedge or prism 1051 adjacent to the input wedge 1054. The output wedge 1051 may include an output surface 1058 that is substantially parallel to the output/input surface 1053 of the input wedge 1054. The output wedge 1051 may also include a surface 1057 normal to the output surface 1058, and may share the beam splitting surface 1055 with the input wedge 1054. In the example shown in FIG. 10, the surfaces 1052, 1053, 1057, and 1058 have similar dimensions, forming a cube with the beam splitting surface 1055 at 45 degree angles relative to the input surface 1052, the output/input surface 1053, and the output surface 1058.

The BS 1050 may be made of any optical material, including optical grade glasses or plastics. Lighter-weight materials may be advantageous for HMD applications. In some embodiments, the index of refraction of the BS 1050 at the operating wavelength(s) of light may be at least about 1.5.

The beam splitting surface 1055 may be configured to selectively reflect or transmit light which is incident upon it. The beam splitting surface 1055 may be reflective to light having a first state and transmissive to light having a second state. For example, the BS 1050 may be a polarizing BS (PBS) whose beam splitting surface 1055 selectively reflects light of a first polarization state (e.g., s-polarization state) and selectively transmits light of a second polarization state (e.g., p-polarization state). Thus, where the input beam (illustrated by the input light ray 1035) has the first polarization state (e.g., s-polarization state), the input light may be reflected toward the SLM 540. Meanwhile, modulated light (illustrated by modulated light ray 1075) that has the second polarization state (e.g., p-polarization state) may be transmitted through the beam splitting surface 1055. While selective reflection and transmission of light by the beam splitting surface 1055 is described with reference to first and second polarization states, other characteristics of light can also be used to achieve this selectivity, which may be based on an angle of incidence, wavelength, phase, and the like. The beam splitting surface 1055 may be made of an optical material or have an optical coating designed to achieve the desired beam splitting characteristics.

In embodiments where the BS 1050 is a PBS, the input light beam (illustrated by the input light ray 1035) may have the first polarization state (e.g., s-polarization state). A collimator 1010 may be provided between the light source 1030 and the BS 1050 to collimate the input beam for uniform illumination of the input surface 1052. The collimated input light beam, including input light ray 1035, is transmitted to the input surface 1052 where it enters the BS 1050 and is then selectively reflected by the beam splitting surface 1055. This results in a reflected light beam (illustrated by reflected light ray 1065), which is transmitted from the beam splitting surface 1055 to the output/input surface 1053, where the reflected light beam exits the BS 1050 and is incident on the SLM 540.

The SLM 540, or an intervening optical component, may be configured to receive the reflected light beam (including the reflected light ray 1065) having the first polarization state (e.g., s-polarization state) and to convert it to the second polarization state (e.g., p-polarization state). The SLM 540 also modulates the reflected light beam with, or based on, image information and then reflects a modulated light beam (illustrated by the modulated light ray 1075) back toward the output/input surface 1053 of the BS 1050. The modulated light beam is then transmitted or reflected by the beam splitting surface 1055, depending on its polarization state (e.g., s-polarization state or p-polarization state).

The SLM 540 may be controlled by, for example, the controller 560 of FIG. 6 to switch individual pixels between "on" and "off" states, thereby encoding the modulated light with the image information. In some embodiments, when a pixel of the SLM 540 is "on," it may convert the polarization state of the reflected light ray 1065 from a first polarization state to the second polarization state, such that the corresponding modulated light ray 1075 is transmitted through the beam splitting surface 1055 to the projection optics 1080. In the "off" state, the polarization state of the reflected light ray 1065 is not converted, and the corresponding modulated light ray 1075 is reflected back toward the light source 1030 or is disposed of elsewhere in the light projector system 1020. Thus, the BS 1050 may selectively transmit the modulated light beam (illustrated by the modulated light ray 1075) to the projection optics 1080. The projection optics 1080 then relay the modulated light beam to the user's eye.

While the above description is made with reference to the s-polarized state as the first polarization state and the p-polarized state as the second polarization state, other configurations are possible. For example, the first polarization state may be the p-polarization state and the second polarization state may be the s-polarization state. Furthermore, different SLMs 540 are possible and the embodiments herein may be configured with beam splitters and optical components capable of selectively reflecting and transmitting light to and from these other SLMs 540. For example, rather than a LCOS panel, the SLM 540 may be a digital light processing (DLP) panel that receives light at a first angle (e.g., a first state) and modulates and reflects the light at a different angle (e.g., second state), thereby encoding the light with image information.

For some display systems, such as HMD applications, it may be desirable to provide for (1) full and uniform illumination of the SLM 540 and (2) illumination in a direction normal to the SLM 540. The BS 1050 may be selected to have optical characteristics to achieve these characteristics. For example, the BS 1050 may receive collimated light normal to the input surface 1052 and reflect the light in a direction normal to the output/input surface 1053. Accordingly, in the embodiment of FIG. 10, the BS 1050 is a cube where the length of the input surface 1052 (also referred to herein as the height of the BS 1050) is the same as the length of the output/input surface 1053 and the output surface 1058 (also referred to herein as the width of the BS 1050). The beam splitting surface 1055 extends from the junction of the input surface 1052 and the output surface 1058 to the junction of the output/input surface 1053 and the surface 1057 at a 45 degree angle. This configuration permits the input light ray 1035 to be incident normal to the input surface 1052 and reflected in a direction normal to the output/input surface 1053. It also permits the SLM 540 to be fully and uniformly illuminated. Undesirably, these cubic dimensions may increase the volume occupied by the BS 1050, as well as its weight, in the light projector system 1020 or the display system 60 of FIG. 2. Accordingly, it may be desirable to provide a low-profile light projector system for use in compact and light weight display applications.

Example of a Low-Profile Light Projector System

Figure 11A:
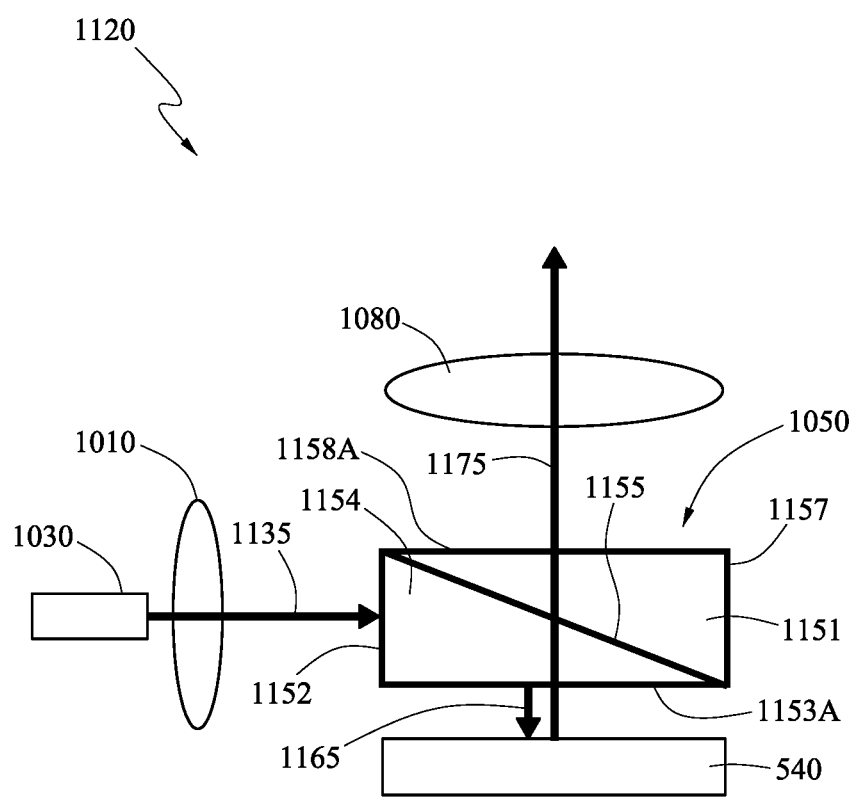
FIG. 11A illustrates an example light projector system which includes a low-profile BS, a light source, and a light modulator, according to some embodiments.

FIG. 11A illustrates an example low-profile light projector system 1120 used to provide image information to a user, according to some embodiments. The low-profile light projector system 1120 includes a low-profile BS 1150, a light source 1030, and an SLM 540. The low-profile light projector system 1120 is similar to the light projector system 1020 of FIG. 10 but with some important differences. For example, the low-profile light projector system 1120 uses a low-profile BS 1150 configured to reduce the overall height of the low-profile light projector system 1120 without negatively affecting the optical performance (e.g., illumination coverage of the SLM 540, brightness, contrast, resolution, and the like). Embodiments of the low-profile light projector system 1120 described herein with reference to FIG. 11A can be used with HMD systems described herein (e.g., the display system 60 of FIG. 2 or the light projector system 520 of FIG. 6). For example, the light source 1030 may be part of the light module 530 of FIG. 6 and the low-profile BS 1150 may be the BS 550, where the light projector system 1120 is configured to direct light into projection optics 1080 (e.g., image injection device 360, 370, 380, 390, or 400 or one or more of the waveguides 270, 280, 290, 300, or 310).

As shown in FIG. 11A, the light source 1030 is configured to emit an input beam including an input light ray 1135. Only a single input light ray 1135 is shown in FIG. 11A for illustrative purposes only. The input light ray 1135 of FIG. 11A may be substantially similar to the input light ray 1035 of FIG. 10.

The low-profile BS 1150 has an input surface 1152, a beam splitting surface 1155, and an output/input surface 1153A. The input surface 1152, the beam splitting surface 1155, and the output/input surface 1153A may be surfaces of an input wedge or prism 1154. In such embodiments, the input surface 1152 and the output/input surface 1153A may be adjacent to one another and joined at a 90 degree angle. The BS 1150 may also include an output wedge or prism 1151 adjacent to the input wedge element 1154. The output wedge 1151 may include an output surface 1158A that is substantially parallel to the output/input surface 1153A of the input wedge 1154. The output wedge 1151 may also include a surface 1157 normal to the output surface 1158A, and may share the beam splitting surface 1155 with the input wedge 1154.

The low-profile BS 1150 may be made of any optical material, including optical grade glasses or plastics. Lighter-weight materials may be advantageous for HMD applications. In some embodiments, the index of refraction of the low-profile BS 1150 at the operating wavelength(s) of light may be at least about 1.5.

The low-profile BS 1150 may be substantially similar to BS 1050 of FIG. 10, except that the beam splitting surface 1155 is arranged at an angle less than 45 degrees relative to the output/input surface 1153A. For example, the angle of the beam splitting surface 1155 with respect to the output/input surface 1153A may be 40 degrees or less, 35 degrees or less, or 30 degrees or less. Reducing the angle of the beam splitting surface 1155 with respect to the output/input surface 1153A reduces the length of the input surface 1152 (and surface 1157), thereby reducing the overall size of the light projector system 1120. To maintain the desired optical performance, including full and uniform illumination of the SLM 540 at a direction normal to the receiving surface of the SLM 540, the low-profile BS 1150 may have a diffractive optical element (described below in connection with FIGS. 12A-13D) disposed on, in, or adjacent to the input surface 1152 to manipulate the input light beam (represented by input light ray 1135).

As shown in FIG. 11A, the input light beam is collimated by a collimator 1010 and is orthogonally incident on the input surface 1152. The diffractive optical element (e.g., the transmissive diffractive optical element 1256 in FIGS. 12A-12B, or the reflective diffractive optical element 1356 in FIGS. 13A-13D) manipulates the propagation angle of the input light beam (represented by the input light ray 1135) at the input surface 1152 of the low-profile BS 1150 such that the input beam is converted into one or more diffracted beams that are directed toward the beam splitting surface 1155 (possibly after one or more internal reflections at other surfaces of the low-profile BS 1150) at angles such that the beam splitting surface 1155 selectively reflects the light (e.g., reflected light ray 1165) in a direction substantially parallel to the input surface 1152 and normal to the output/input surface 1153A. The reflected light ray 1165 is then normally incident on the SLM 540. As described above in connection to FIG. 10, the SLM 540 modulates the reflected light beam (represented by the reflected light ray 1165) with image information and reflects the modulated light beam (represented by modulated light ray 1175) through the low-profile BS 1150 to the projection optics 1080. The beam splitting surface 1155 can selectively reflect and/or transmit light of different states in the same way as discussed above with respect to FIG. 10.

One advantage of the low-profile BS 1150 shown in FIG. 11A is a reduction in the size and weight of the low-profile BS 1150 relative to the BS 1050 of FIG. 10. In some embodiments, the length of at least one dimension of the low-profile BS 1150 (e.g., the length of the input surface 1052) may be reduced to as little as 0.58 times the size of another dimension of the low-profile BS 1150 (e.g., the length of the output/input surface 1153A).

Figure 11B:
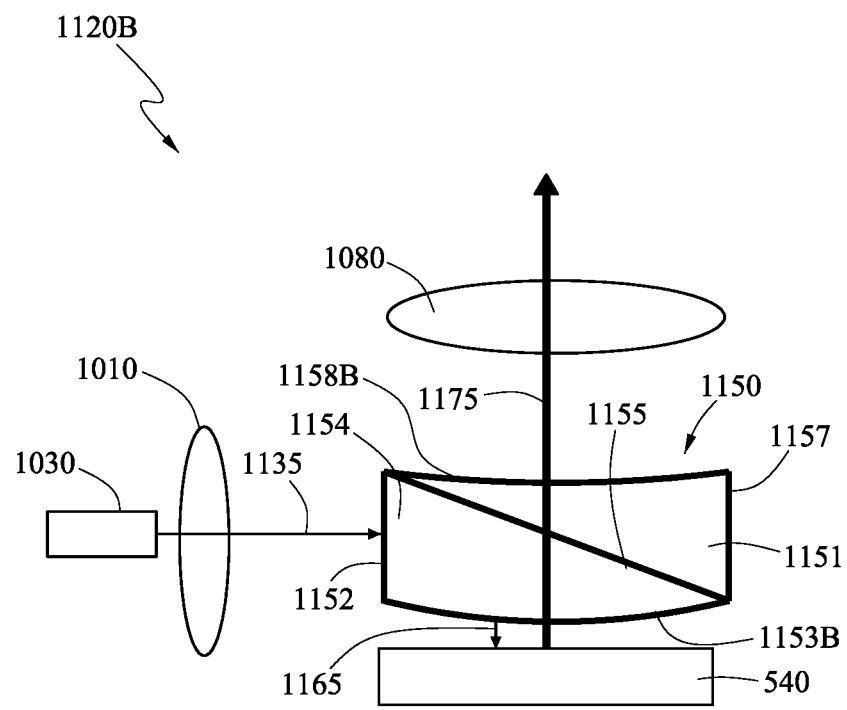
FIG. 11B illustrates an example light projector system which includes a low-profile BS, a light source, and a light modulator, according to some embodiments.

FIG. 11B illustrates an example low-profile light projector system 1120B used to provide image information to a user, according to some embodiments. An output/input surface 1153B and an output surface 1158B illustrated in FIG. 11B are curved surfaces whereas the output/input surface 1153A and the output surface 1158A illustrated in FIG. 11A are flat surfaces. Although FIG. 11B illustrates both the output/input surface 1153B and the output surface 1158B as curved surfaces, in some embodiments, either one of the output/input surface 1153B or the output surface 1158B may be curved. In some configurations, it may be faster and/or cheaper to mold the output/input surface 1153B and/or the output surface 1158B than the output/input surface 1153A and/or the output surface 1158A, especially in mass production.

In some embodiments, the output/input surface 1153B and/or the output surface 1158B may function as lenses. For example, the output/input surface 1153B may be used as a field lens. In this example, the output/input surface 1153B is a positive-powered field lens that is between the light modulator 540 and the projection optics 1080. The output/input surface 1153B changes the size of the image coming from the light modulator 540. Having the output/input surface 1153B proximal to the SLM 540 may enhance imaging performance such as by correcting field flatness, field curvature, and/or image distortion. For example, the output/input surface 1153B may take the image coming out of the light modulator 540 and tilt light beams of the image inward so as to decrease a spread of the image. This allows for downstream optical elements, such as the projection optics 1080, to have a height that is less than a width, and/or to be spaced further apart from the low-profile BS 1150. Having the output/input surface 1153B proximal to the SLM 540 may further enable the projection optics 1080 to be made more low-profile thereby making the low-profile light projection system 1120 more low-profile.

In some embodiments, the low-profile BS 1150 may be larger (e.g., longer and wider) than the SLM 540. In these embodiments, there may be sufficient overfill of light going from the low-profile BS 1150 towards the light modulator 540.

Examples of Low-Profile Beam Splitters

Figure 12A:
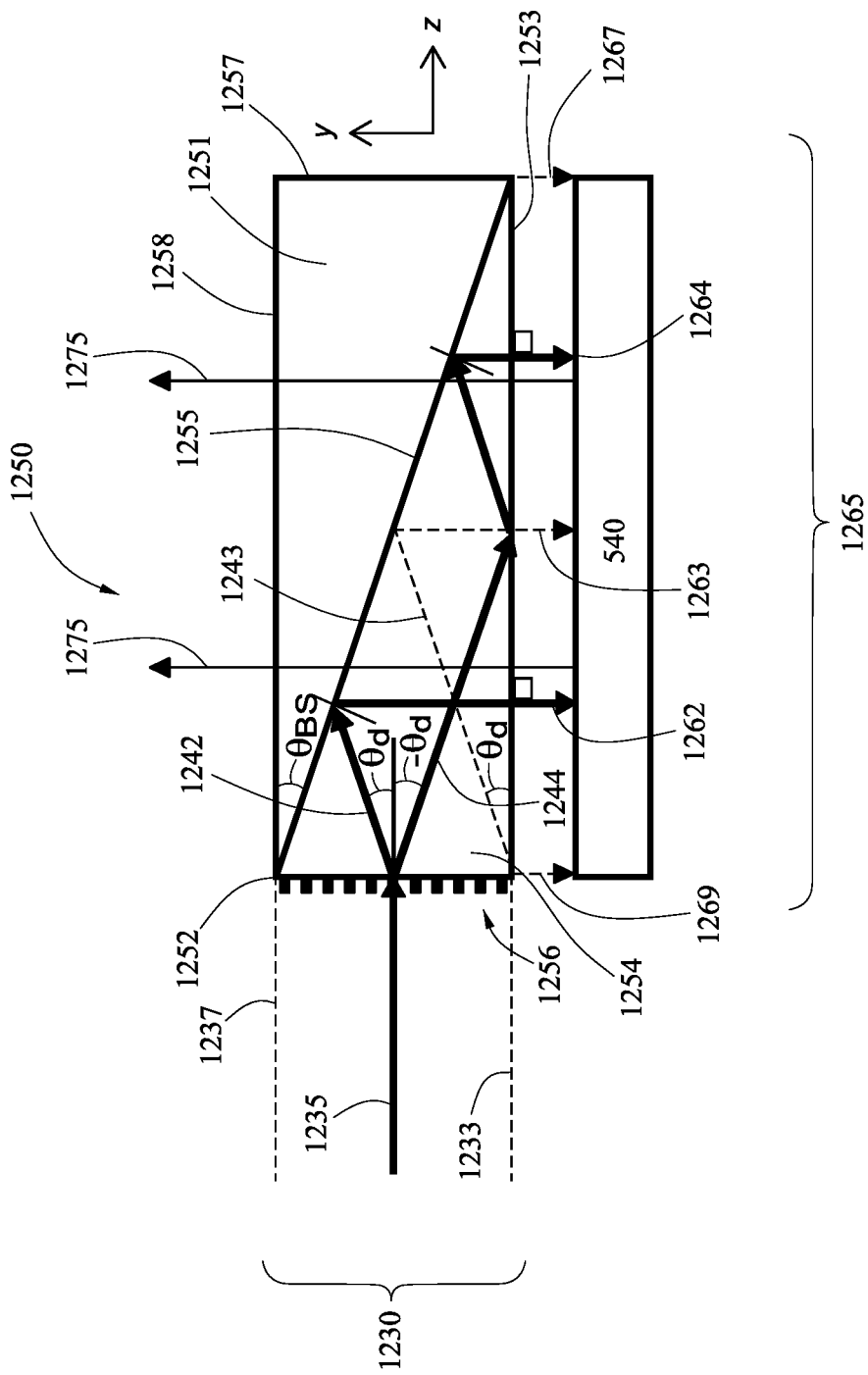
FIGS. 12A and 12B illustrate an example low-profile BS with a transmissive diffractive optical element for use in a low-profile light projector system, according to some embodiments.
Figure 12B:
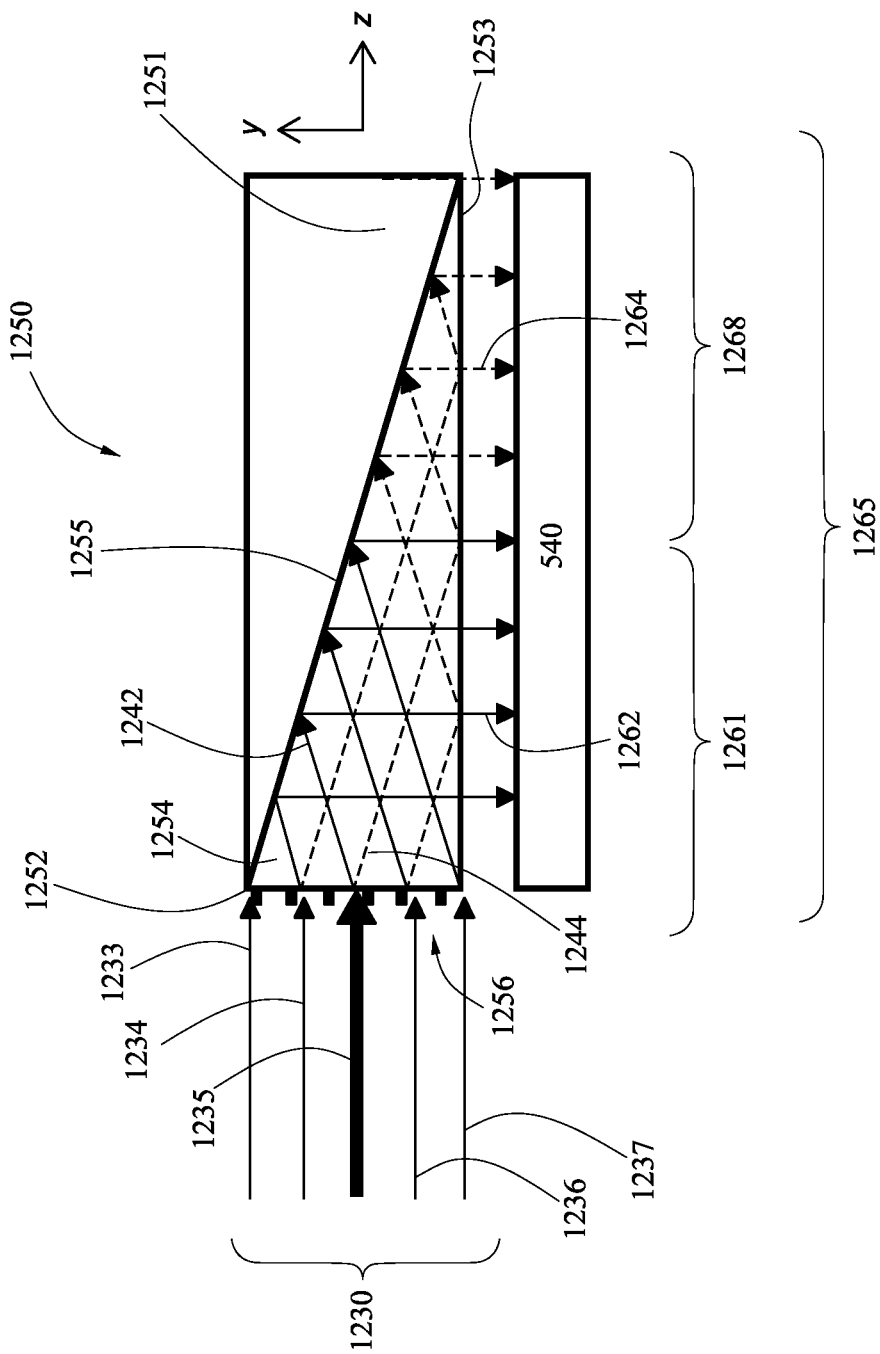

Various embodiments of the low-profile BS 1150 are described in connection with FIGS. 12A-13D. For example, FIGS. 12A and 12B schematically illustrate an example low-profile BS 1250 which includes a transmissive diffractive optical element 1256. The transmissive diffractive optical element 1256 is configured to convert an input light beam (e.g., collimated input light beam 1230) into one or more diffracted light beams which reflect from various surfaces of the low-profile BS 1250 such that the corresponding reflected light beam(s) (e.g., reflected light beam 1265) travel normal to an output/input surface 1253. FIGS. 12A and 12B show an example coordinate system for illustrative purposes only, where the vertical y-axis is orthogonal to the horizontal z-axis, which are both orthogonal to a horizontal x-axis (not shown) that extends into and out of the page.

The low-profile BS 1250 has an input surface 1252, a beam splitting surface 1255, and the output/input surface 1253. The input surface 1252, the beam splitting surface 1255, and the output/input surface 1253 may be surfaces of an input wedge or prism 1254. In such embodiments, the input surface 1252 and the output/input surface 1253 may be adjacent to one another and joined at a 90 degree angle. The beam splitting surface 1255 may be arranged at an angle between the input surface 1252 and the output/input surface 1253. The low-profile BS 1250 may also include an output wedge or prism 1251 adjacent to the input wedge 1254. The output wedge 1251 may include an output surface 1258 that is substantially parallel to the output/input surface 1253 of the input wedge 1254. The output wedge 1251 may also include a surface 1257 normal to the output surface 1258, and may share the beam splitting surface 1255 with the input wedge 1254.

The low-profile BS 1250 may be made of any optical material, including optical grade glasses or plastics. Lighter-weight materials may be advantageous for HMD applications. In some embodiments, the index of refraction of the low-profile BS 1250 at the operating wavelength(s) of light may be at least about 1.5.

The beam splitting surface 1255 of the low-profile BS 1250 may be arranged at an angle less than 45 degrees, and more particularly 40 degrees or less, 35 degrees or less, or 30 degrees or less, relative to the output/input surface 1253, thereby reducing the overall size of the low-profile BS 1250 along the y-axis. To maintain the desired optical performance, including full and uniform illumination of the SLM 540 at a direction normal to the receiving surface of the SLM 540, the low-profile BS 1250 includes the transmissive diffractive optical element 1256 on, in, or adjacent to the input surface 1252. The transmissive diffractive optical element 1256 may be positioned between a light source (e.g., the light source 1030 of FIG. 11) and the input surface 1252. In some embodiments, the transmissive diffractive optical element 1256 may be formed, for example, by etching diffractive features into the input surface 1252 or by attaching the transmissive diffractive optical element 1256 to the input surface 1252. The transmissive diffractive optical element 1256 manipulates a collimated input light beam 1230. For example, the transmissive diffractive optical element 1256 may be configured to receive the collimated input light beam 1230 in a direction normal to the input surface 1252. The transmissive diffractive optical element 1256 may then convert the collimated input light beam 1230 into one or more diffracted light beams that are diffracted at one or more corresponding diffraction angles such that the diffracted light beams are directed toward the beam splitting surface 1255 (possibly after one or more intervening reflections from other surfaces of the low-profile BS 1250) and reflected toward the output/input surface 1253 at a normal angle as a reflected beam 1265. The reflected beam 1265 is then incident on the SLM 540, which modulates the light with image information and then reflects a modulated beam 1275 back into the output/input surface 1253, through the beam splitting surface 1255, and out the output surface 1258.

In various embodiments, the transmissive diffractive optical element 1256 includes one or more diffractive features that form a diffraction grating. Generally, diffraction gratings have a periodic structure, which splits and diffracts an incident light beam into several beams traveling in different directions. Each of these diffracted beams corresponds to a particular diffraction order. The directions of the diffracted beams depend on various characteristics of the diffraction grating, including the period of the periodic structure and the wavelength of the light. The transmissive diffractive optical element 1256 can be designed according to known equations and techniques to diffract incident light into one or more desired diffractive orders with one or more desired corresponding diffraction angles.

As shown in FIG. 12A, the collimated input light beam 1230 may be incident upon the input surface 1252 of the BS 1250. The collimated input light beam 1230 may be emitted by a light source (e.g., light source 1030 of FIG. 11) and collimated by a collimator (e.g., collimator 1010 of FIG. 11). The collimated input light beam 1230 is made up of one or more input light rays which may be fully and uniformly incident across the entire input surface 1252 of the low-profile BS 1250. For example, the collimated input light beam 1230 may include a center input light ray 1235, a lower input light ray 1233, and upper input light ray 1237. Only three input light rays 1233, 1235, and 1237 are shown in FIG. 12A for illustrative purposes.

In some embodiments, the low-profile BS 1250 may have a polarizing beam splitting surface 1255 (as described above in connection with FIG. 10). The beam splitting surface 1255 may be arranged at an angle $\theta_{BS}$ with respect to the z-axis. The collimated input light beam 1230, having a first polarization state (e.g., s-polarization state), is incident normal to the transmissive diffractive optical element 1256 and is diffracted into one or more diffracted beams. Two diffracted beams are illustrated in FIG. 12A by a first diffracted light ray 1242 diffracted at an angle $\theta_d$ upward from normal and a second diffracted light ray 1244 diffracted at the angle $\theta_d$ downward from normal, each having the first polarization state. The angle $\theta_d$ may be based on the spatial frequency or period of the transmissive diffractive optical element 1256. The first and second diffracted light rays 1242, 1244 may be the positive first order and negative first order diffracted light rays, respectively. In other embodiments, it may be possible to utilize higher diffraction orders (e.g., second order, third order, etc.). In some embodiments, it may be advantageous to design the transmissive diffractive optical element 1256 to diffract at least 80%, or at least 90%, or at least 95% of the collimated input light beam 1230 into the first and second diffractive orders.

The first diffracted light ray 1242 travels to the beam splitting surface 1255 at the diffraction angle $\theta_d$, and is then reflected, based on the angle of the beam splitting surface 1255 relative to the z-axis, toward the SLM 540 as a reflected first diffracted light ray 1262 at an angle normal to the z-axis (and also normal to the output/input surface 1253 and the SLM 540). The second diffracted light ray 1244 travels toward the output/input surface 1253 at the diffraction angle $\theta_d$, which is configured to result in total internal reflection (TIR) of the second diffracted light ray 1244 at the output/input surface 1253 toward the beam splitting surface 1255. The beam splitting surface 1255 then reflects the second diffracted light ray 1244 as a reflected second diffracted light ray 1264 at an angle normal to the z-axis (and also normal to the output/input surface 1253 and the SLM 540). As described above, the SLM 540 may then convert the first polarization state (e.g., s-polarization state) of the reflected first and second diffracted light rays 1262, 1264 to the second polarization state (e.g., p-polarization state) and also modulate the light with image data.

In the illustrated embodiment, the reflected first diffracted light beam (illustrated by the first diffracted light ray 1262) is incident on the left side of the SLM 540, providing left side illumination, and the reflected second diffracted light beam (illustrated by the second diffracted light ray 1264) is incident on the right side of the SLM 540, providing right side illumination. In some embodiments, each diffracted light ray 1242, 1244 may have approximately half of the energy of the center input light ray 1235 that is transmitted into the low-profile BS 1250. Accordingly, approximately half of the light that enters the BS 1250 is transmitted to the left side of the SLM 540, and half of the light that enters the BS 1250 is transmitted to the right side of the SLM 540.

While the foregoing description refers primarily to the behavior of the center input light ray 1235, all of the light rays included in the collimated input light beam 1230 are similarly diffracted and reflected. For example, the lower input light ray 1233 is diffracted as diffracted light ray 1243 (at the diffraction angle $\theta_d$) and reflected as light ray 1263. Accordingly, the low-profile BS 1250 facilitates full, continuous, and uniform illumination of the SLM 540 in a direction normal to the surface of the SLM 540.

In some embodiments, the angle $\theta_{BS}$ in the low-profile BS 1250 may be less than 45 degrees (e.g., 40 degrees or less, 35 degrees or less, or 30 degrees or less), and the angle $\theta_d$ may be greater than 0 degrees (e.g., 15 degrees or more, 20 degrees or more, 25 degrees or more, or 30 degrees or more). In some embodiments, the angle $\theta_{BS}$ and the angle $\theta_d$ in the low-profile BS 1250 may be the same, or approximately the same. For example, both of these angles may be approximately 30 degrees (e.g., within 15% of 30 degrees). One non-limiting advantage of angles $\theta_{BS}$ and $\theta_d$ being 30 degrees is that the height of the low-profile BS 1250 along the y-axis may be reduced by approximately 58% relative to the BS 1050 of FIG. 10. The angle $\theta_{BS}$ may be selected based on the desired length of the input surface 1252 (e.g., the desired height of the low-profile BS 1250) and to induce TIR of the second diffracted light ray 1244. As the angle $\theta_{BS}$ of the beam splitting surface 1255 decreases, the angle of diffraction $\theta_d$ increases (and vice versa). For a diffraction angle of zero degrees, the beam splitting surface 1255 would be arranged at 45 degrees with respect to the z-axis, as described in connection to FIG. 10. Diffraction angles which are too large, however, may result in the second diffracted light ray 1244 failing to TIR within the low-profile BS 1250. This may result in unwanted gaps or overlaps of the illumination of the SLM 540.

FIG. 12B illustrates an example of full, uniform, and continuous illumination of the SLM 540 using the low-profile BS 1250. FIG. 12B is substantially similar to FIG. 12A, except that additional input light rays 1234 and 1236 are illustrated as part of the collimated input light beam 1230. Each of the input light rays 1233-1237 is diffracted by the transmissive diffractive optical element 1256 into one or more diffracted light rays (not labeled for ease of illustration). These diffracted light rays are reflected by the beam splitting surface 1255 (for some of the diffracted light rays, this occurs after TIR at the output/input surface 1253), and are directed to the SLM 540 at a direction normal to the receiving surface of the SLM 540, as described above in connection with FIG. 12A. As described above, the first diffracted light rays (illustrated as solid lines) are each diffracted upward toward the beam splitting surface 1255 at a diffraction angle $\theta_d$. These rays are then reflected as a first group of reflected light rays 1261 to the left side of the SLM 540, providing left side continuous illumination. Similarly, the second diffracted light rays (illustrated as dotted lines) are each diffracted downward toward the output/input surface 1253 at a diffraction angle $-\theta_d$. These rays undergo TIR at the output/input surface 1253, reflecting upward toward the beam splitting surface 1255 where they are each reflected downward as a second group of reflected light rays 1268 to the right side of the SLM 540, providing right side continuous illumination. Accordingly, the low-profile BS 1250 is capable of providing full, continuous, and uniform illumination in a direction normal to the SLM 540.

While FIGS. 12A and 12B illustrate an example low-profile BS 1250 with a transmissive diffractive optical element 1256, other configurations are possible. For example, a reflective diffractive optical element may be used in place of the transmissive diffractive optical element 1256, as illustrated in FIGS. 13A-13D.

Figure 13A:
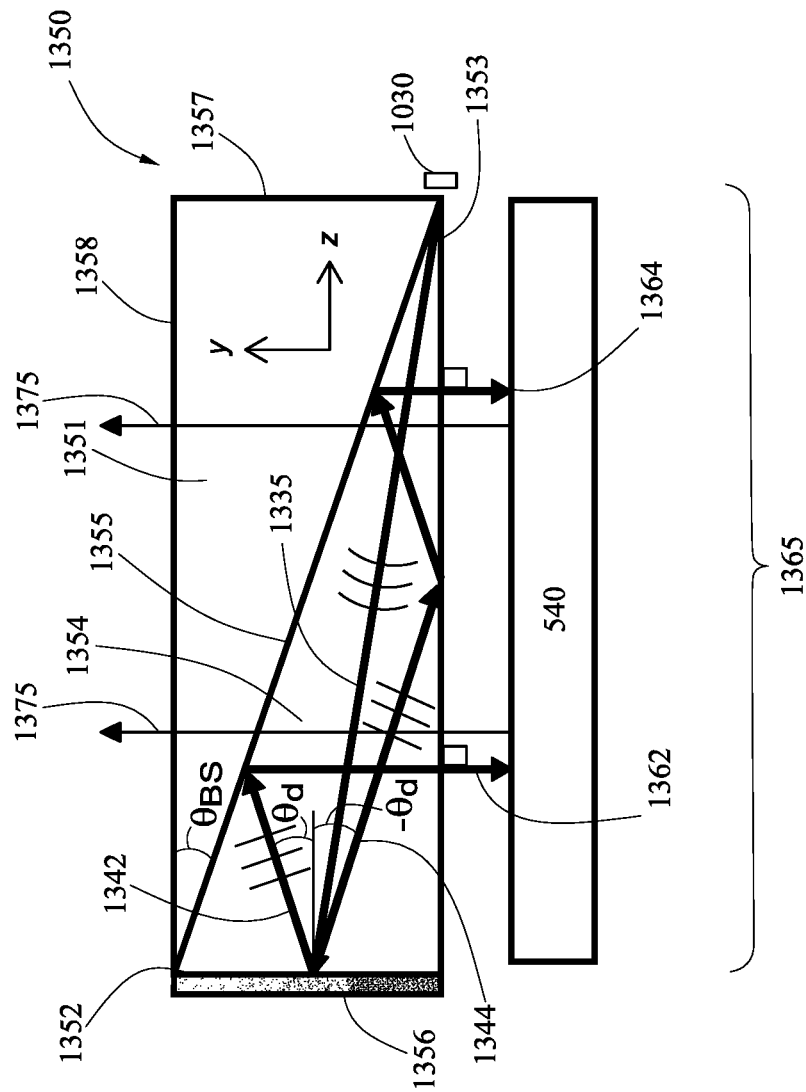
FIG. 13A illustrates an example low-profile BS with a reflective diffractive optical element for use in a low-profile light projector system, according to some embodiments.

FIG. 13A illustrates an example low-profile BS 1350 which includes a reflective diffractive optical element 1356. In a manner similar to what is described in connection with FIGS. 12A and 12B, the reflective diffractive optical element 1356 is configured to convert an input light beam (represented by input light ray 1335) into one or more diffracted light beams which reflect from various surfaces of the low-profile BS 1350 such that the corresponding reflected light beam(s) (e.g., reflected light beam 1365) travel normal to an output/input surface 1353. The reflective diffractive optical element 1356 may also be designed to perform additional functions, such as collimation of one or more diverging input beams of light. The reflective diffractive optical element 1356 may also be designed to multiplex angularly and/or laterally displaced input beams of light from multiple light sources. In some embodiments, the reflective diffractive optical element 1356 is a hologram, such as a holographic optical element (HOE). FIGS. 13A-13D show an example coordinate system for illustrative purposes only, where the vertical y-axis is orthogonal to the horizontal z-axis, which are both orthogonal to a horizontal x-axis (not shown) that extends into and out of the page.

The low-profile BS 1350 has a surface 1352 where the reflective diffractive optical element 1356 is located. The low-profile BS 1350 also includes an input surface 1357, a beam splitting surface 1355, and an output/input surface 1353. The beam splitting surface 1355, the output/input surface 1353, and the surface 1352 may be surfaces of an input wedge or prism 1354. In such embodiments, the surface 1352 and the output/input surface 1353 may be adjacent to one another and joined at a 90 degree angle. The beam splitting surface 1355 may be arranged at an angle $\theta_{BS}$ with respect to the z-axis, where the angle $\theta_{BS}$ of the beam splitting surface 1355 may be similar to the angle $\theta_{BS}$ of the beam splitting surface 1255 in FIGS. 12A and 12B. The BS 1350 may also include an output wedge or prism 1351 adjacent to the input wedge 1354. The output wedge 1351 may include an output surface 1358 that is substantially parallel to the output/input surface 1353. The output wedge 1351 also includes the input surface 1357 normal to the output surface 1358, and may share the beam splitting surface 1355 with the input wedge 1354.

The low-profile BS 1350 may be made of any optical material, including optical grade glasses or plastics. Lighter-weight materials may be advantageous for HMD applications. In some embodiments, the index of refraction of the low-profile BS 1350 at the operating wavelength(s) of light may be at least about 1.5.

The reflective diffractive optical element 1356 may be disposed on, in, or adjacent to the surface 1352. The reflective diffractive optical element 1356 may be formed, for example, by etching diffractive features into the surface 1352 or by attaching the reflective diffractive optical element 1356 to the surface 1352.

A light source (e.g., the light source 1030) may emit an input beam of light having the first polarization state (e.g., s-polarization state). The input beam of light may enter the BS 1350 at the corner of the input wedge 1354 where the beam splitting surface 1355 intersects with the output/input surface 1353. The input beam of light (represented by the input light ray 1335) travels through the input wedge 1354 toward the reflective diffractive optical element 1356. The input beam of light may diverge as it travels through the input wedge 1354, as indicated by the superimposed curved lines on the input light ray 1335 which are representative of a non-planar wavefront. The reflective diffractive optical element 1356 may be configured to manipulate the input beam of light in one or more ways. For example, the reflective diffractive optical element 1356 may be configured to receive the diverging input beam of light (represented by the input light ray 1335) and convert it into one or more collimated and diffracted beams.

A first collimated and diffracted beam is represented by a first collimated and diffracted light ray 1342, while a second collimated and diffracted beam is represented by a second collimated and diffracted light ray 1344. Straight lines are shown superimposed on the first and second collimated and diffracted light rays 1342, 1344, which represent the planar wavefronts of a collimated beam. The first and second collimated and diffracted light rays 1342, 1344 may be diffracted at one or more angles $\theta_d$ in a manner similar to the diffracted light rays 1242, 1244 of FIG. 12A. For example, the first collimated and diffracted light ray 1342 may be diffracted upward at an angle $\theta_d$ with respect to the z-axis, while the second diffracted light ray 1344 may be diffracted downward at an angle $\theta_d$ with respect to the z-axis. In some embodiments, the first and second collimated and diffracted beams may correspond to the positive first order and negative first order, though it may be possible to user higher diffractive orders in other embodiments. In some embodiments, it may be advantageous to design the reflective diffractive optical element 1356 to diffract at least 80%, or at least 90%, or at least 95% of the input beam of light into the first and second diffractive orders.

In some embodiments, the low-profile BS 1350 may have a polarizing beam splitting surface 1355 (as described above in connection with FIG. 10). The beam splitting surface 1355 may be arranged at an angle $\theta_{BS}$ with respect to the z-axis. The first collimated and diffracted light ray 1342 travels to the beam splitting surface 1355 at the diffraction angle $\theta_d$, and is then reflected, based on the angle of the beam splitting surface 1355 relative to the z-axis, toward the SLM 540 as a reflected first diffracted light ray 1362 at an angle normal to the z-axis (and also normal to the output/input surface 1353 and the spatial light modulator 540). The second collimated and diffracted light ray 1344 travels toward the output/input surface 1353 at the diffraction angle $\theta_d$, which is configured to result in TIR of the second collimated and diffracted light ray 1344 at the output/input surface 1353 toward the beam splitting surface 1355. The beam splitting surface 1355 then reflects the second collimated and diffracted light ray 1344, based on the angle of the beam splitting surface 1355 relative to the z-axis, toward the SLM 540 as a reflected second diffracted light ray 1364. The reflected light beam 1365 (which includes the reflected first diffracted light ray 1362 and the reflected second diffracted light ray 1364) is then incident on the SLM 540. As described above, the SLM 540 may then convert the first polarization state (e.g., s-polarization state) of the reflected light beam 1365 to the second polarization state (e.g., p-polarization state) and also modulate the light with image data. The SLM 540 can then reflect a modulated beam 1375 back into the output/input surface 1353, through the beam splitting surface 1355, and out the output surface 1358.

In the illustrated embodiment, the reflected first diffracted light beam (illustrated by the reflected first diffracted light ray 1362) is incident on the left side of the SLM 540, providing left side illumination. The reflected second diffracted light beam (illustrated by the reflected second diffracted light ray 1364) is incident on the right side of the SLM 540, providing right side illumination. In some embodiments, each collimated and diffracted light beam (represented by the collimated and diffracted light rays 1342, 1344) may have approximately half of the energy of the input beam that is transmitted into the low-profile BS 1350. Accordingly, approximately half of the light that enters the BS 1350 is transmitted to the left side of the SLM 540 and half of the light that enters the BS 1350 is transmitted to the right side of the SLM 540.

While the foregoing description refers primarily to the behavior of a single input light ray 1335, all of the light rays included in the diverging input beam are similarly collimated, diffracted, and reflected. Accordingly, the low-profile BS 1350 facilitates full, continuous, and uniform illumination of the SLM 540 in a direction normal to the surface of the SLM 540.

Similar to the low-profile BS 1250 of FIG. 12A, the angle $\theta_{BS}$ in the low-profile BS 1350 may be less than 45 degrees (e.g., 40 degrees or less, 35 degrees or less, or 30 degrees or less), and the angle $\theta_d$ may be greater than 0 degrees (e.g., 15 degrees or more, 20 degrees or more, 25 degrees or more, or 30 degrees or more). In some embodiments, the angle $\theta_{BS}$ and the angle $\theta_d$ in the low-profile BS 1350 may be the same, or approximately the same. For example, both of these angles may be approximately 30 degrees (e.g., within 15% of 30 degrees). Again, one non-limiting advantage of angles $\theta_{BS}$ and $\theta_d$ being 30 degrees is that the height of the low-profile BS 1350 along the y-axis may be reduced by approximately 58% relative to the BS 1050 of FIG. 10. The angle $\theta_{BS}$ may be selected based on the desired height of the low-profile BS 1350 and to induce TIR of the second diffracted light ray 1344. As the angle $\theta_{BS}$ of the beam splitting surface 1355 decreases, the angle of diffraction $\theta_d$ increases (and vice versa). For a diffraction angle of zero degrees, the beam splitting surface 1355 would be arranged at 45 degrees with respect to the z-axis, as described in connection to FIG. 10. Diffraction angles which are too large, however, may result in the second diffracted light ray 1344 failing to TIR within the low-profile BS 1350. This may result in unwanted gaps or overlaps of the illumination of the SLM 540.

As just discussed, the reflective diffractive optical element 1356 may serve at least two functions: (1) collimating diverging input light from a light source (e.g., the light source 1030); and (2) diffracting and reflecting the collimated light at one or more angles such that the diffracted beams are ultimately reflected toward the SLM 540 in a direction normal to the output/input surface 1353. A non-limiting advantage of the embodiment illustrated in FIG. 13A is that a separate collimator (e.g., collimator 1010) may be omitted and the light source (e.g., light source 1030) may be positioned closer to the low-profile BS 1350, thereby providing a more compact low-profile light projector system. The reflective diffractive optical element 1356 may serve yet another function in embodiments where multiple input beams are emitted into the BS 1350 from different locations.

The light projector system 1120 may include multiple light sources for emitting light of different wavelengths (e.g., light rays 770, 780, and 790 of FIGS. 9A-9C). The reflective diffractive optical element 1356 may therefore be configured to receive one or more angularly and/or laterally separated input beams of different wavelengths from one or more light sources located at different positions and to convert those input beams into corresponding collimated and diffracted beams having a reduced amount of angular and/or lateral separation. To achieve this functionality, the reflective diffractive optical element 1356 may be configured to separately manipulate light from the different light sources based in part on the different wavelength(s) of light they emit or on their angles of incidence. The light sources may be laterally separated from one another and/or may emit beams of light at different angles. The reflective diffractive optical element 1356 may be configured to direct light received from the light sources into one or more common multiplexed light beams.

Figure 13B:
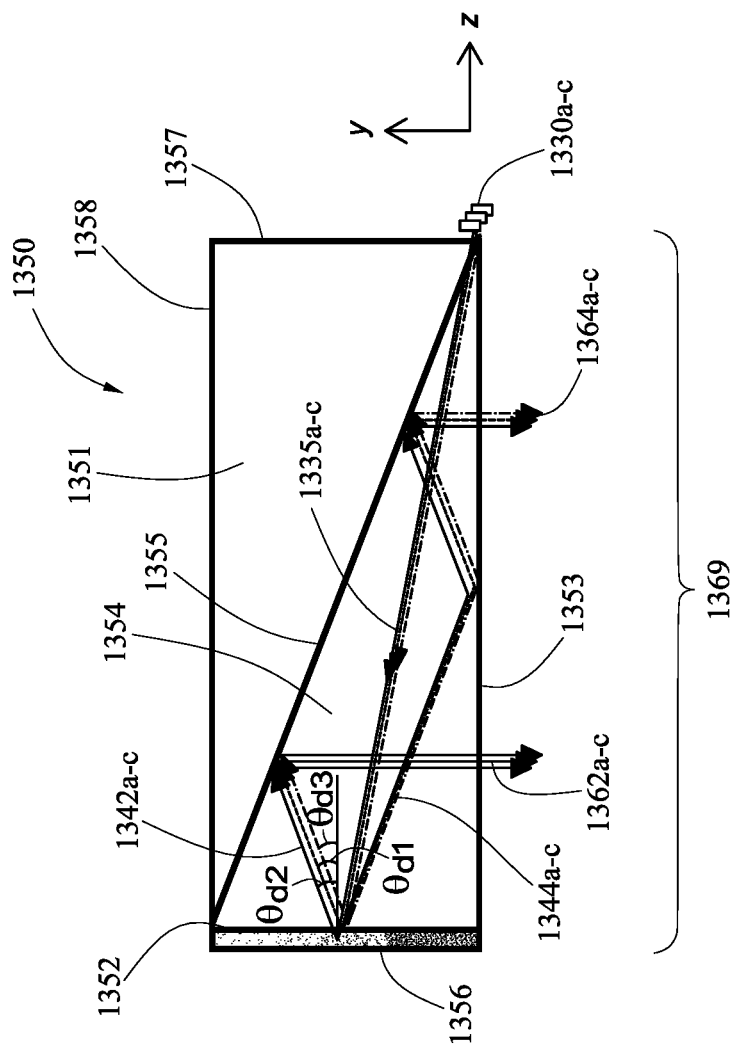

FIGS. 13B and 13C respectively illustrate a side view and a top view of the low-profile BS 1350, according to some embodiments. FIGS. 13B and 13C show the multiplexing of light from multiple light sources 1330a-c into one or more common beams. Three light sources 1330a-c are provided at a corner of the input wedge 1354. These three light sources 1330a-c are laterally offset from one another along the x-axis. While three light sources 1330a-c are shown in FIGS. 13B and 13C, any number of light sources may be provided (e.g., 1, 2, 4, 5, etc.) as desired for a given application.

FIG. 13B illustrates a side view of the low-profile BS 1350, as described above in connection with FIG. 13A. The low-profile BS 1350 is illuminated with the light sources 1330a-c at the corner of the input wedge 1354 that produce three corresponding input light beams (illustrated by input light rays 1335a-c). In some embodiments, the light sources 1330a-c (e.g., LEDs or fiber delivered lasers, etc.) can be optically and/or physically coupled to the input wedge 1354. Similar to FIG. 13A, the reflective diffractive optical element 1356 receives the input light beams (illustrated by input light rays 1335a-c), and converts the input light beams into corresponding first collimated, multiplexed, and diffracted light beams (illustrated by first collimated, multiplexed, and diffracted light rays 1342a-c). The reflective diffractive optical element 1356 also converts the input light beams (illustrated by input light rays 1335a-c) into second collimated, multiplexed, and diffracted light beams (illustrated by second collimated, multiplexed, and diffracted light rays 1344a-c). As described herein, the first and second collimated, multiplexed, and diffracted light rays 1342a-c, 1344a-c are reflected at a diffraction angle $\theta_d$ in a manner substantially similar to the first and second collimated and diffracted light rays 1342, 1344 of FIG. 13A. The first and second collimated, multiplexed, and diffracted light rays 1342a-c, 1344a-c are directed toward the beam splitting surface 1355 (in some cases after having first reflected from the output/input surface 1353) and are then reflected to the SLM 540 as a reflected multiplexed beam 1369. The reflected multiplexed beam 1369 may be made up of reflected first and second multiplexed, diffracted light rays 1362a-c, 1364a-c incident on the SLM 540 in a direction normal to the SLM 540.

As shown in FIG. 13C, the reflective diffractive optical element 1356 may be configured to receive angularly and/or laterally separated diverging input beams (represented by input light rays 1335a-c). These input beams may originate from the light sources 1330a-c which may be laterally separated along the x-axis. The light sources 1330a-c may be directed generally toward the surface 1352 where the reflective diffractive optical element 1356 is located. In some embodiments, each light source 1330a-c may be positioned at a different angle relative to the z-axis so as to fully illuminate the surface area of the surface 1352 from different lateral positions. For example, light source 1330a may be directed normal to the surface 1352 along the z-axis, while light source 1330b may be angled slightly downward relative to the z-axis and light source 1330c may be angled slightly upward relative to the z-axis so as to fill the surface 1352 with light from each light source 1330a-c. Thus, the three input beams (represented by input light rays 1335a-c) may have some degree of angular separation.

In some embodiments, the light sources 1330a-c may be configured to emit input light beams (represented by input light rays 1335a-c), respectively, of different colors or different ranges of wavelengths (which are represented in FIGS. 13B and 13C with different line styles). Thus, for illustrative purposes, light source 1330a may emit green light (represented by dashed lines), light source 1330b may emit red light (represented by solid lines), and light source 1330c may emit blue light (represented by dash-dot lines). Other colors and configurations are possible, for example, the light sources 1330a-c may emit magenta, cyan, or green light or may emit IR or near-IR light.

As shown in FIG. 13C, the reflective diffractive optical element 1356 may be configured to convert the input light beams (represented by input light rays 1335a-c) into corresponding collimated, multiplexed, and diffracted light beams (represented by collimated, multiplexed, and diffracted rays 1342a-c, 1344a-c). Converting the input light rays 1335a-c into the collimated and diffracted light rays 1342a-c, 1344a-c is described above in connection to FIG. 13B. In addition, the reflective diffractive optical element 1356 multiplexes the input light rays 1335a-c into one or more multiplexed light beams, such that the first collimated, multiplexed, and diffracted light rays 1342a-c propagate with a reduced amount of angular or lateral separation, or no angular or lateral separation at all. The same is true of the second collimated, multiplexed, and diffracted light rays 1344a-c. In some embodiments, the first collimated, multiplexed, and diffracted light rays 1342a-c may be multiplexed to propagate along a substantially common optical path. The same is true of the second collimated, multiplexed, and diffracted light rays 1344a-c.

A non-limiting advantage of the reflective diffractive optical element 1356 being configured to multiplex input beams from the light sources 1330a-c is that light of a plurality of colors may be encoded with image information and presented to the user providing a full color image (e.g., as light rays 770, 780, and 790).

In some embodiments (e.g., the ones described with respect to FIGS. 13B and 13C), it may be desirable to provide a reflective diffractive optical element 1356 that can separately and individually manipulate light from each light source 1330a-c. To achieve this functionality, the reflective diffractive optical element 1356 may be configured to interact differently with light depending upon its wavelength or its angle of incidence. For example, the reflective diffractive optical element 1356 may receive the input light beam represented by the input light rays 1335a of a first wavelength at a first angle and convert it to a collimated, diffracted light beam, represented by the collimated, diffractive light rays 1342a, 1344a, at a first diffraction angle $\theta_{d1}$. The reflective diffractive optical element 1356 may receive the input light beam represented by the input light rays 1335b of a second wavelength at a second angle and convert it to a collimated, diffracted light beam, represented by the collimated, diffracted light rays 1342b, 1344b, at a second diffraction angle $\theta_{d2}$. The reflective diffractive optical element 1356 may receive the input light beam represented by the input light rays 1335c of a third wavelength at a third angle and convert it to a collimated, diffracted light beam, represented by the collimated, diffracted light rays 1342c, 1344c, at a third diffraction angle $\theta_{d3}$. The first, second, and third diffraction angles $\theta_{d1}$, $\theta_{d2}$, and $\theta_{d3}$, respectively, may each be different or one or more may be the same. The first, second, and third diffraction angles $\theta_{d1}$, $\theta_{d2}$, and $\theta_{d3}$, respectively, may be selected to multiplex the collimated, diffracted light rays 1342a-c, 1344a-c.

The reflective diffractive optical element 1356 may be, for example, a surface or volume hologram, such as a holographic optical element (HOE) designed to operate as described above. In some embodiments, the HOE may include one or more layers that each have an interference pattern formed therein to operate on a selected wavelength or range of wavelengths and/or a selected range of incidence angles. For example, a first layer of the HOE may be configured to operate on the input light rays 1335a (e.g., green light in this example) and may include an interference pattern recorded using wavelengths of light corresponding to the wavelengths of the input light ray 1335a. Other layers may include interference patterns configured to operate on other light rays, based on their wavelength and/or angle of incidence. These interference patterns may, too, be recorded using the corresponding input light rays (e.g., 1335b or 1335c).

In some embodiments, layers of the reflective diffractive optical element 1356 may have different depths along the z-axis. For example, a first layer may have a depth selected to pass the input light rays 1335a and 1335b (e.g. green and red light, respectively, in this example) unaffected, while converting the input light rays 1335c (e.g., blue light in this example) as described above. For example, a longer wavelength of light may pass through a given layer, while a shorter wavelength may interact with the same layer due to selecting the appropriate depth for the layer (e.g., blue light may interact with a layer that green light may pass through, green light may interact with a layer that red light may pass through).

The reflective diffractive optical element 1356 may therefore serve three functions in some embodiments: (1) collimating input light for the light sources 1330a-c; (2) diffracting and reflecting the light at angles such that the diffracted light rays are reflected toward the SLM 540 in a direction normal to the output/input surface 1353; and (3) multiplexing angularly and/or laterally separated input beams from the light sources 1330a-c.

Figure 13D:
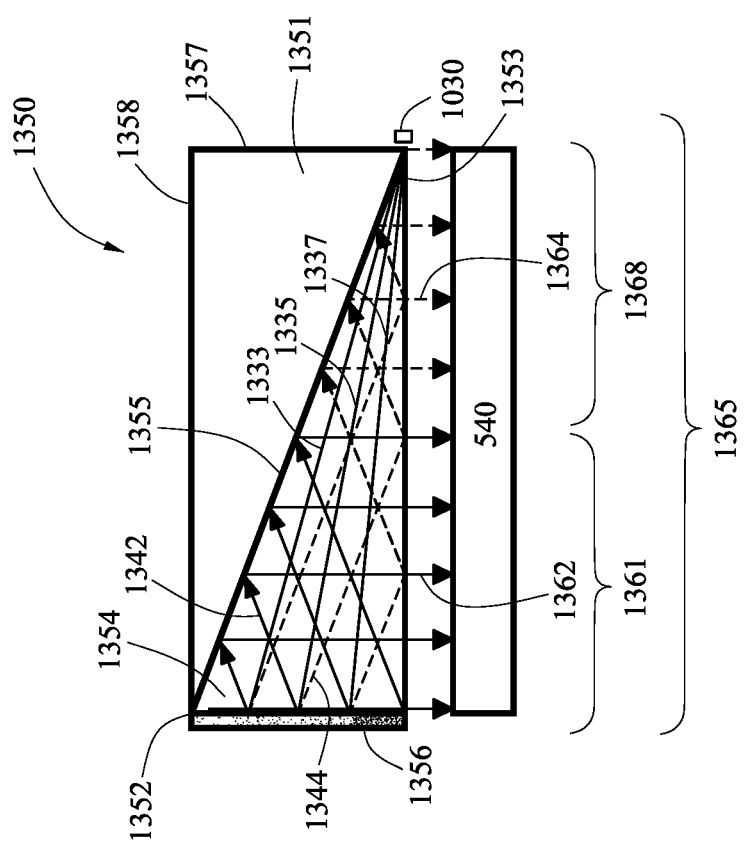
FIG. 13D illustrates the low-profile BS of FIG. 13A, showing continuous and uniform illumination of a spatial light modulator, according to some embodiments.

FIG. 13D illustrates an example of full, uniform, and continuous illumination of the SLM 540 using the low-profile BS 1350, according to some embodiments. FIG. 13D is substantially similar to FIG. 13A except that additional input light rays 1333 and 1337 are illustrated as part of the input beam. Each input light ray 1333, 1335, 1337 is diffracted by the reflective diffractive optical element 1356 into diffracted light rays 1342 (solid lines) and 1344 (dashed lines). (For ease of illustration, not all of the diffracted light rays 1342 and 1344 are labeled.) These diffracted light rays are reflected by the beam splitting surface 1355 (for some of the diffracted light rays, this occurs after TIR at the output/input surface 1353), and are directed to the SLM 540 in a direction normal to the receiving surface of the SLM 540, as described above in connection with FIG. 13A. First diffracted light rays (illustrated as solid lines) are each diffracted upward toward the beam splitting surface 1355 at a diffraction angle $\theta_d$. These rays are then reflected as a first group of reflected light rays 1361 to the left side of the SLM 540, providing left side continuous illumination. Similarly, second diffracted light rays (illustrated as dotted lines) are each diffracted downward toward the output/input surface 1353 at a diffraction angle $-\theta_d$. These rays undergo TIR at the output/input surface 1353, reflecting upward toward the beam splitting surface 1355 where they are each reflected downward as a second group of reflected light rays 1368 to the right side of the SLM 540, providing right side continuous illumination. (The first and second groups of reflected light rays 1361 and 1368 may be referred to as reflected light rays 1365.) Accordingly, the low-profile BS 1350 is capable of providing full, continuous, and uniform illumination in a direction normal to the light modulator 540.

Example Embodiments

In some embodiments, an optical device comprises: a first surface comprising a transmissive diffractive optical element; a second surface normal to the first surface; and a third surface arranged at an angle to the second surface, the third surface being reflective to light of a first state and transmissive to light of a second state, wherein the transmissive diffractive optical element is configured to receive a collimated input beam that is normally incident on the first surface, the collimated input beam comprising light having the first state, and to convert the collimated input beam into at least a first diffracted beam at a first diffraction angle such that the first diffracted beam is directed toward the third surface and is reflected by the third surface in a direction substantially parallel to the first surface.

In these embodiments, the first diffracted beam can exit the optical device at the second surface, the optical device can further comprise a spatial light modulator adjacent to the second surface to receive the first diffracted beam, the spatial light modulator configured to convert the first diffracted beam into a first modulated beam, the first modulated beam comprising light having the second state, and to direct the first modulated beam back toward the second surface.

In these embodiments, the spatial light modulator can be a liquid crystal on silicon (LCOS) spatial light modulator or a digital light processing (DLP) spatial light modulator.

In these embodiments, the optical device can further comprise a fourth surface opposite the second surface, wherein the fourth surface is configured to receive and transmit the first modulated beam after it passes through the second surface, and wherein the fourth surface is curved.

In these embodiments, the transmissive diffractive optical element can be further configured to convert the collimated input beam into a second diffracted beam at a second diffraction angle such that the second diffracted beam is directed toward the second surface, is reflected by the second surface toward the third surface via total internal reflection, and is reflected by the third surface in the direction substantially parallel to the first surface.

In these embodiments, the reflected first diffracted beam and the reflected second diffracted beam can be received by a spatial light modulator, wherein the reflected first diffracted beam and the reflected second diffracted beam combine to illuminate the entire spatial light modulator.

In these embodiments, the first, second, and third surfaces can be planar.

In these embodiments, the second surface can be a curved surface.

In these embodiments, the first, second, and third surfaces can form a wedge.

In these embodiments, the wedge can comprise a refractive index of at least approximately 1.5.

In these embodiments, the third surfaces can comprise a polarizing beam splitting surface.

In these embodiments, the angle of the third surface with respect to the second surface can be less than 45 degrees.

In these embodiments, the angle of the third surface with respect to the second surface can be about 30 degrees.

In these embodiments, the first diffraction angle can be greater than 0 degrees.

In these embodiments, the first diffraction angle can be about 30 degrees.

In these embodiments, the transmissive diffractive optical element can comprise a plurality of diffractive features.

In these embodiments, the first diffraction angle can be based on a period of the plurality of diffractive features.

In some embodiments, an optical device comprises: a first surface comprising a reflective diffractive optical element; a second surface normal to the first surface; and a third surface arranged at an angle to the second surface, the third surface being reflective to light of a first state and transmissive to light of a second state; wherein the reflective diffractive optical element is configured to receive a diverging input beam, the diverging input beam comprising light having the first state, and to convert the diverging input beam into at least a first collimated and diffracted beam at a first diffraction angle such that the first collimated and diffracted beam is directed toward the third surface and is reflected by the third surface in a direction substantially parallel to the first surface.

In these embodiments, the first collimated and diffracted beam can exit the optical device at the second surface, and the optical device can further comprise a spatial light modulator adjacent to the second surface to receive the first collimated and diffracted beam, the spatial light modulator configured to convert the first collimated and diffracted beam into a first modulated beam, the first modulated beam comprising light having the second state, and to direct the first modulated beam back toward the second surface.

In these embodiments, the spatial light modulator can be a liquid crystal on silicon (LCOS) spatial light modulator or a digital light processing (DLP) spatial light modulator.

In these embodiments, the optical device can further comprise a fourth surface opposite the second surface, wherein the fourth surface is configured to receive and transmit the first modulated beam after it passes through the second surface, and wherein the fourth surface is curved.

In these embodiments, the reflective diffractive optical element can be further configured to convert the diverging input beam into a second collimated and diffracted beam at a second diffraction angle such that the second collimated and diffracted beam is directed toward the second surface, is reflected by the second surface toward the third surface via total internal reflection, and is reflected by the third surface in the direction substantially parallel to the first surface.

In these embodiments, the reflected first collimated and diffracted beam and the reflected second collimated and diffracted beam can be received by a spatial light modulator, wherein the reflected first collimated and diffracted beam and the reflected second collimated and diffracted beam combine to illuminate the entire spatial light modulator.

In these embodiments, the reflective diffractive optical element can be configured to receive a plurality of angularly or laterally separated diverging input beams and to convert them into collimated and diffracted beams with a reduced amount of angular or lateral separation.

In these embodiments, the optical device can further comprise a plurality of laterally separated light sources to output the plurality of angularly or laterally separated diverging input beams.

In these embodiments, the reflective diffractive optical element can be configured to receive a first input beam of the a plurality of angularly or laterally separated diverging input beams at a first angle and to convert the first input beam into a corresponding first collimated and diffracted beam directed toward the third surface along an optical path, and to receive a second input beam of the a plurality of angularly or laterally separated diverging input beams at a second angle and to convert the second input beam into a second collimated and diffracted beam directed toward the third surface along the optical path.

In these embodiments, the first, second, and third surfaces can be planar.

In these embodiments, the second surface can be a curved surface.

In these embodiments, the first, second, and third surfaces can form a wedge.

In these embodiments, the wedge can comprise a refractive index of at least approximately 1.5.

In these embodiments, the third surface can comprise a polarizing beam splitting surface.

In these embodiments, the angle of the third surface with respect to the second surface can be less than 45 degrees.

In these embodiments, the angle of the third surface with respect to the second surface can be about 30 degrees.

In these embodiments, the first diffraction angle can be greater than 0 degrees.

In these embodiments, the first diffraction angle can be about 30 degrees.

In these embodiments, the first diffraction angle can be based on a period of diffractive features of the reflective diffractive optical element.

In these embodiments, the reflective diffractive optical element can comprise a hologram.

In some embodiments, a head mounted display (HMD) configured to be worn on a head of a user comprises: a frame; projection optics supported by the frame and configured to project an image to an eye of the user; and a light projector system in optical communication with the projection optics, the light projector system configured to provide modulated light encoded with the image, the light projector system comprising: a light source to emit an input beam; an optical device comprising: a first surface with a diffractive optical element, a second surface normal to the first surface, and a third surface arranged at an angle to the second surface, the third surface being reflective to light of a first state and transmissive to light of a second state, wherein the diffractive optical element is configured to receive the input beam, the input beam comprising light having the first state, and to convert the input beam into at least a first diffracted beam at a first diffraction angle such that the first diffracted beam is directed toward the third surface and is reflected by the third surface in a direction substantially parallel to the first surface; and a spatial light modulator configured to produce the modulated light using the input beam delivered to the spatial light modulator by the optical device.

In these embodiments, the diffractive optical element can comprise a transmissive diffractive optical element.

In these embodiments, the diffractive optical element can comprise a reflective diffractive optical element.

In these embodiments, the diffractive optical element can comprise a diffraction grating.

In these embodiments, the diffractive optical element can comprise a hologram.

In these embodiments, the HMD can further comprise a collimator disposed between the optical device and the light source.

In these embodiments, the projection optics can comprise: in-coupling optical elements; and out-coupling optical elements, wherein the in-coupling optical elements are configured to receive and in-couple the modulated light, and wherein the out-coupling optical elements are configured to out-couple the in-coupled light towards the eye of the user.

In these embodiments, the projection optics can comprise a stack of waveguides.

In these embodiments, each waveguide can be configured to out-couple light with a different amount of divergence in comparison to one or more other waveguides of the stack of waveguides.

In some embodiments, an optical device comprises: a first surface comprising a diffractive optical element; a second surface normal to the first surface; and a third surface arranged at an angle to the second surface, the third surface being reflective to light of a first state and transmissive to light of a second state, wherein the diffractive optical element is configured to receive an input beam, the input beam comprising light having the first state, and to convert the input beam into at least a first diffracted beam at a first diffraction angle such that the first diffracted beam is directed toward the third surface and is reflected by the third surface in a direction substantially parallel to the first surface.

In these embodiments, the diffractive optical element can comprise a transmissive diffractive optical element.

In these embodiments, the diffractive optical element can comprise a reflective diffractive optical element.

In these embodiments, the diffractive optical element can comprise a diffraction grating.

In these embodiments, the diffractive optical element can comprise a hologram.

In these embodiments, the input beam can be collimated by a collimator separate from the optical device.

In these embodiments, the diffractive optical element can be configured to convert the input beam into a first collimated and diffracted beam.

In these embodiments, the first and second states can be a first polarization state and a second polarization state, respectively.

In some embodiments, a method of transmitting image information to a user comprises: providing an optical device comprising a first surface, a second surface normal to the first surface, and a third surface arranged at an angle to the second surface, the third surface being reflective to light of a first state and transmissive to light of a second state; producing an input beam incident on the first surface, the input beam traveling normal to the first surface and having a first state; providing a transmissive diffractive optical element on the first surface to convert the input beam into at least a first diffracted beam at a first diffraction angle such that the first diffracted beam is directed toward the third surface and is reflected by the third surface in a direction substantially parallel to the first surface; modulating at least the reflected first diffracted beam with image information using a spatial light modulator, the spatial light modulator being configured to receive the reflected first diffracted beam normal to the spatial light modulator and to produce a modulated light beam having a second state; receiving the modulated light beam using one or more projection optical components; and projecting the image information to the user using the one or more projection optical components.

In these embodiments, the method can further comprise collimating the input beam with a collimator disposed adjacent to the optical device.

In these embodiments, the angle of the third surface with respect to the second surface can be less than 45 degrees.

In these embodiments, the angle of the third surface with respect to the second surface can be about 30 degrees.

In these embodiments, the first diffraction angle can be greater than 0 degrees.

In these embodiments, the first diffraction angle can be about 30 degrees.

In some embodiments, a method of transmitting image information to a user comprises: providing an optical device comprising a first surface, a second surface normal to the first surface and a third surface arranged at an angle with respect to the second surface, the third surface being reflective to light of a first state and transmissive to light of a second state; producing a diverging input light beam incident onto the first surface, the diverging input light beam having a first state; providing a reflective diffractive optical element on the first surface to convert the diverging input beam into at least a first collimated and diffracted beam at a first diffraction angle such that the first collimated and diffracted beam is directed toward the third surface and is reflected by the third surface in a direction substantially parallel to the first surface; modulating at least the reflected first diffracted beam with image information using a spatial light modulator, the spatial light modulator configured to receive the reflected first diffracted beam normal to the spatial light modulator and to produce a modulated light beam having a second state; receiving the modulated light beam using one or more projection optical components; and projecting the image information to the user using the one or more projection optical components.

In these embodiments, the method can further comprise using the reflective diffractive optical element to convert the diverging input beam into a second collimated and diffracted beam at a second diffraction angle such that the second collimated and diffracted beam is directed toward the second surface, is reflected by the second surface toward the third surface via total internal reflection, and is reflected by the third surface in the direction substantially parallel to the first surface.

In these embodiments, the method can further comprise producing a plurality of angularly or laterally separated diverging input beams and using the reflective diffractive optical element to convert them into collimated and diffracted beams with a reduced amount of angular or lateral separation.

In these embodiments, the angle of the third surface with respect to the second surface can be less than 45 degrees.

In these embodiments, the angle of the third surface with respect to the second surface can be about 30 degrees.

In these embodiments, the first diffraction angle can be greater than 0 degrees.

In these embodiments, the first diffraction angle can be about 30 degrees.

Additional Considerations

In the embodiments described above, the optical arrangements have been described in the context of eye-imaging display systems and, more particularly, augmented reality display systems. It will be understood, however, that the principles and advantages of the optical arrangements can be used for other head-mounted display, optical systems, apparatus, or methods. In the foregoing, it will be appreciated that any feature of any one of the embodiments can be combined and/or substituted with any other feature of any other one of the embodiments.

Unless the context clearly requires otherwise, throughout the description and the claims, the words "comprise," "comprising," "include," "including," "have" and "having" and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Depending on the context, "coupled" or "connected" may refer to an optical coupling or optical connection such that light is coupled or connected from one optical element to another optical element. Additionally, the words "herein," "above," "below," "infra," "supra," and words of similar import, when used in this application, shall refer to this application as a whole and not to any particular portions of this application. Where the context permits, words in the above Detailed Description using the singular or plural number may also include the plural or singular number, respectively. The word "or" in reference to a list of two or more items is an inclusive (rather than an exclusive) "or", and "or" covers all of the following interpretations of the word: any of the items in the list, all of the items in the list, and any combination of one or more of the items in the list, and does not exclude other items being added to the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements, and/or states are in any way required for one or more embodiments or whether these features, elements, and/or states are included or are to be performed in any particular embodiment.

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions, and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. Each of these blocks may be implemented in a variety of different ways. Any suitable combination of the elements and acts of the various embodiments described above can be combined to provide further embodiments. The various features and processes described above may be implemented independently of one another, or may be combined in various ways. No element or combinations of elements is necessary or indispensable for all embodiments. All suitable combinations and sub-combinations of features of this disclosure are intended to fall within the scope of this disclosure.

What is claimed is:

1. An optical device comprising:
   a first surface comprising a transmissive diffractive optical element;
   a second surface normal to the first surface; and
   a third surface arranged at an angle to the second surface, the third surface being reflective to light of a first state and transmissive to light of a second state,
   wherein the transmissive diffractive optical element is configured to receive a collimated input beam that is normally incident on the first surface, the collimated input beam comprising light having the first state, and to convert the collimated input beam into at least a first diffracted beam at a first diffraction angle such that the first diffracted beam is directed toward the third surface and is reflected by the third surface in a direction substantially parallel to the first surface.

2. The optical device of claim 1, wherein the first diffracted beam exits the optical device at the second surface, the optical device further comprising a spatial light modulator adjacent to the second surface to receive the first diffracted beam, the spatial light modulator configured to convert the first diffracted beam into a first modulated beam, the first modulated beam comprising light having the second state, and to direct the first modulated beam back toward the second surface.

3. The optical device of claim 2, wherein the spatial light modulator is a liquid crystal on silicon (LCOS) spatial light modulator or a digital light processing (DLP) spatial light modulator.

4. The optical device of claim 2, further comprising a fourth surface opposite the second surface, wherein the fourth surface is configured to receive and transmit the first modulated beam after it passes through the second surface, and wherein the fourth surface is curved.

5. The optical device of claim 1, wherein the transmissive diffractive optical element is further configured to convert the collimated input beam into a second diffracted beam at a second diffraction angle such that the second diffracted beam is directed toward the second surface, is reflected by the second surface toward the third surface via total internal reflection, and is reflected by the third surface in the direction substantially parallel to the first surface.

6. The optical device of claim 5, wherein the reflected first diffracted beam and the reflected second diffracted beam are received by a spatial light modulator, wherein the reflected first diffracted beam and the reflected second diffracted beam combine to illuminate the entire spatial light modulator.

7. The optical device of claim 1, wherein the first, second, and third surfaces are planar.

8. The optical device of claim 1, wherein the second surface is a curved surface.

9. The optical device of claim 1, wherein the first, second, and third surfaces form a wedge.

10. The optical device of claim 9, wherein the wedge comprises a refractive index of at least approximately 1.5.

11. The optical device of claim 1, wherein the third surface comprises a polarizing beam splitting surface.

12. The optical device of claim 1, wherein the angle of the third surface with respect to the second surface is less than 45 degrees.

13. The optical device of claim 12, wherein the angle of the third surface with respect to the second surface is about 30 degrees.

14. The optical device of claim 1, wherein the first diffraction angle is greater than 0 degrees.

15. The optical device of claim 14, wherein the first diffraction angle is about 30 degrees.

16. The optical device of claim 1, wherein the transmissive diffractive optical element comprises a plurality of diffractive features.

17. The optical device of claim 16, wherein the first diffraction angle is based on a period of the plurality of diffractive features.

18. An optical device comprising:
   a first surface comprising a reflective diffractive optical element;
   a second surface normal to the first surface; and
   a third surface arranged at an angle to the second surface, the third surface being reflective to light of a first state and transmissive to light of a second state;
   wherein the reflective diffractive optical element is configured to receive a diverging input beam, the diverging input beam comprising light having the first state, and to convert the diverging input beam into at least a first collimated and diffracted beam at a first diffraction angle such that the first collimated and diffracted beam is directed toward the third surface and is reflected by the third surface in a direction substantially parallel to the first surface.

19. The optical device of claim 18, wherein the first collimated and diffracted beam exits the optical device at the second surface, the optical device further comprising a spatial light modulator adjacent to the second surface to receive the first collimated and diffracted beam, the spatial light modulator configured to convert the first collimated and diffracted beam into a first modulated beam, the first modulated beam comprising light having the second state, and to direct the first modulated beam back toward the second surface.

20. The optical device of claim 19, wherein the spatial light modulator is a liquid crystal on silicon (LCOS) spatial light modulator or a digital light processing (DLP) spatial light modulator.

21. The optical device of claim 19, further comprising a fourth surface opposite the second surface, wherein the fourth surface is configured to receive and transmit the first modulated beam after it passes through the second surface, and wherein the fourth surface is curved.

22. The optical device of claim 18, wherein the reflective diffractive optical element is further configured to convert the diverging input beam into a second collimated and diffracted beam at a second diffraction angle such that the second collimated and diffracted beam is directed toward the second surface, is reflected by the second surface toward the third surface via total internal reflection, and is reflected by the third surface in the direction substantially parallel to the first surface.

23. The optical device of claim 22, wherein the reflected first collimated and diffracted beam and the reflected second collimated and diffracted beam are received by a spatial light modulator, wherein the reflected first collimated and diffracted beam and the reflected second collimated and diffracted beam combine to illuminate the entire spatial light modulator.

24. The optical device of claim 18, wherein the reflective diffractive optical element is configured to receive a plurality of angularly or laterally separated diverging input beams and to convert them into collimated and diffracted beams with a reduced amount of angular or lateral separation.

25. The optical device of claim 24, further comprising a plurality of laterally separated light sources to output the plurality of angularly or laterally separated diverging input beams.

26. The optical device of claim 24, wherein the reflective diffractive optical element is configured to receive a first input beam of the a plurality of angularly or laterally separated diverging input beams at a first angle and to convert the first input beam into a corresponding first collimated and diffracted beam directed toward the third surface along an optical path, and to receive a second input beam of the a plurality of angularly or laterally separated diverging input beams at a second angle and to convert the second input beam into a second collimated and diffracted beam directed toward the third surface along the optical path.

27. The optical device of claim 18, wherein the first, second, and third surfaces are planar.

28. The optical device of claim 18, wherein the second surface is a curved surface.

29. The optical device of claim 18, wherein the first, second, and third surfaces form a wedge.

30. The optical device of claim 29, wherein the wedge comprises a refractive index of at least approximately 1.5.

31. The optical device of claim 18, wherein the third surface comprises a polarizing beam splitting surface.

32. The optical device of claim 18, wherein the angle of the third surface with respect to the second surface is less than 45 degrees.

33. The optical device of claim 32, wherein the angle of the third surface with respect to the second surface is about 30 degrees.

34. The optical device of claim 18, wherein the first diffraction angle is greater than 0 degrees.

35. The optical device of claim 34, wherein the first diffraction angle is about 30 degrees.

36. The optical device of claim 18, wherein the first diffraction angle is based on a period of diffractive features of the reflective diffractive optical element.

37. The optical device of claim 18, wherein the reflective diffractive optical element comprises a hologram.

38. A head mounted display (HMD) configured to be worn on a head of a user, the HMD comprising:
    a frame;
    projection optics supported by the frame and configured to project an image to an eye of the user; and
    a light projector system in optical communication with the projection optics, the light projector system configured to provide modulated light encoded with the image, the light projector system comprising:
        a light source to emit an input beam;
        an optical device comprising:
            a first surface with a diffractive optical element,
            a second surface normal to the first surface, and
            a third surface arranged at an angle to the second surface, the third surface being reflective to light of a first state and transmissive to light of a second state,
            wherein the diffractive optical element is configured to receive the input beam, the input beam comprising light having the first state, and to convert the input beam into at least a first diffracted beam at a first diffraction angle such that the first diffracted beam is directed toward the third surface and is reflected by the third surface in a direction substantially parallel to the first surface; and
        a spatial light modulator configured to produce the modulated light using the input beam delivered to the spatial light modulator by the optical device.

39. The HMD of claim 38, wherein the diffractive optical element comprises a transmissive diffractive optical element.

40. The HMD of claim 38, wherein the diffractive optical element comprises a reflective diffractive optical element.

41. The HMD of claim 38, wherein the diffractive optical element comprises a diffraction grating.

42. The HMD of claim 38, wherein the diffractive optical element comprises a hologram.

43. The HMD of claim 38, further comprising a collimator disposed between the optical device and the light source.

44. The HMD of claim 38, wherein the projection optics comprise:
    in-coupling optical elements; and
    out-coupling optical elements,
    wherein the in-coupling optical elements are configured to receive and in-couple the modulated light, and wherein the out-coupling optical elements are configured to out-couple the in-coupled light towards the eye of the user.

45. The HMD of claim 44, wherein the projection optics comprises a stack of waveguides.

46. The HMD of claim 45, wherein each waveguide is configured to out-couple light with a different amount of divergence in comparison to one or more other waveguides of the stack of waveguides.

47. An optical device comprising:
a first surface comprising a diffractive optical element;
a second surface normal to the first surface; and
a third surface arranged at an angle to the second surface, the third surface being reflective to light of a first state and transmissive to light of a second state,
wherein the diffractive optical element is configured to receive an input beam, the input beam comprising light having the first state, and to convert the input beam into at least a first diffracted beam at a first diffraction angle such that the first diffracted beam is directed toward the third surface and is reflected by the third surface in a direction substantially parallel to the first surface.

48. The optical device of claim 47, wherein the diffractive optical element comprises a transmissive diffractive optical element.

49. The optical device of claim 47, wherein the diffractive optical element comprises a reflective diffractive optical element.

50. The optical device of claim 47, wherein the diffractive optical element comprises a diffraction grating.

51. The optical device of claim 47, wherein the diffractive optical element comprises a hologram.

52. The optical device of claim 47, wherein the input beam is collimated by a collimator separate from the optical device.

53. The optical device of claim 47, wherein the diffractive optical element is configured to convert the input beam into a first collimated and diffracted beam.

54. The optical device of claim 47, wherein the first and second states are a first polarization state and a second polarization state, respectively.

* * * * *